L. GERHARDT.
APPARATUS FOR TESTING THE LEAKAGE QUALITIES OF BLANKS.
APPLICATION FILED OCT. 23, 1917.
1,359,799.
Patented Nov. 23, 1920.
9 SHEETS—SHEET 4.
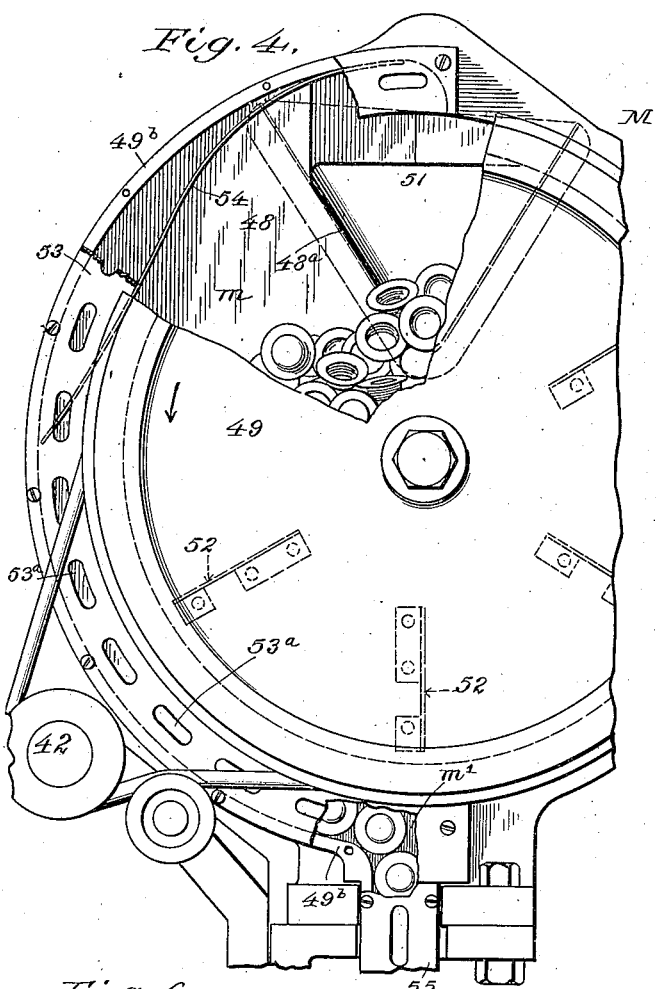
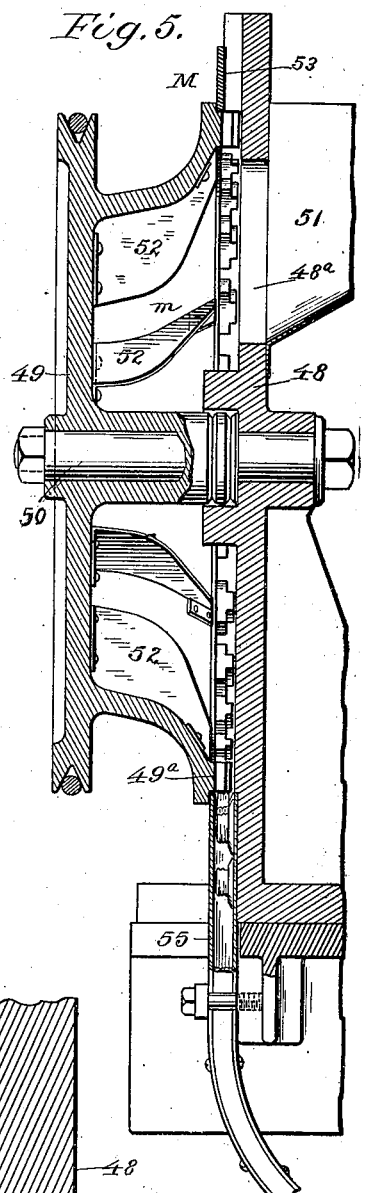
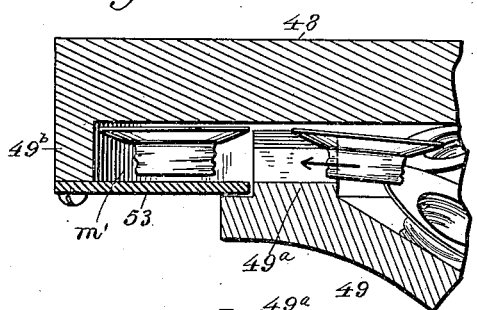
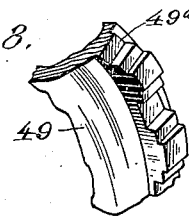
Inventor,
Leonard Gerhardt,
By
Meyers, Cushman & Rea
Attorneys.

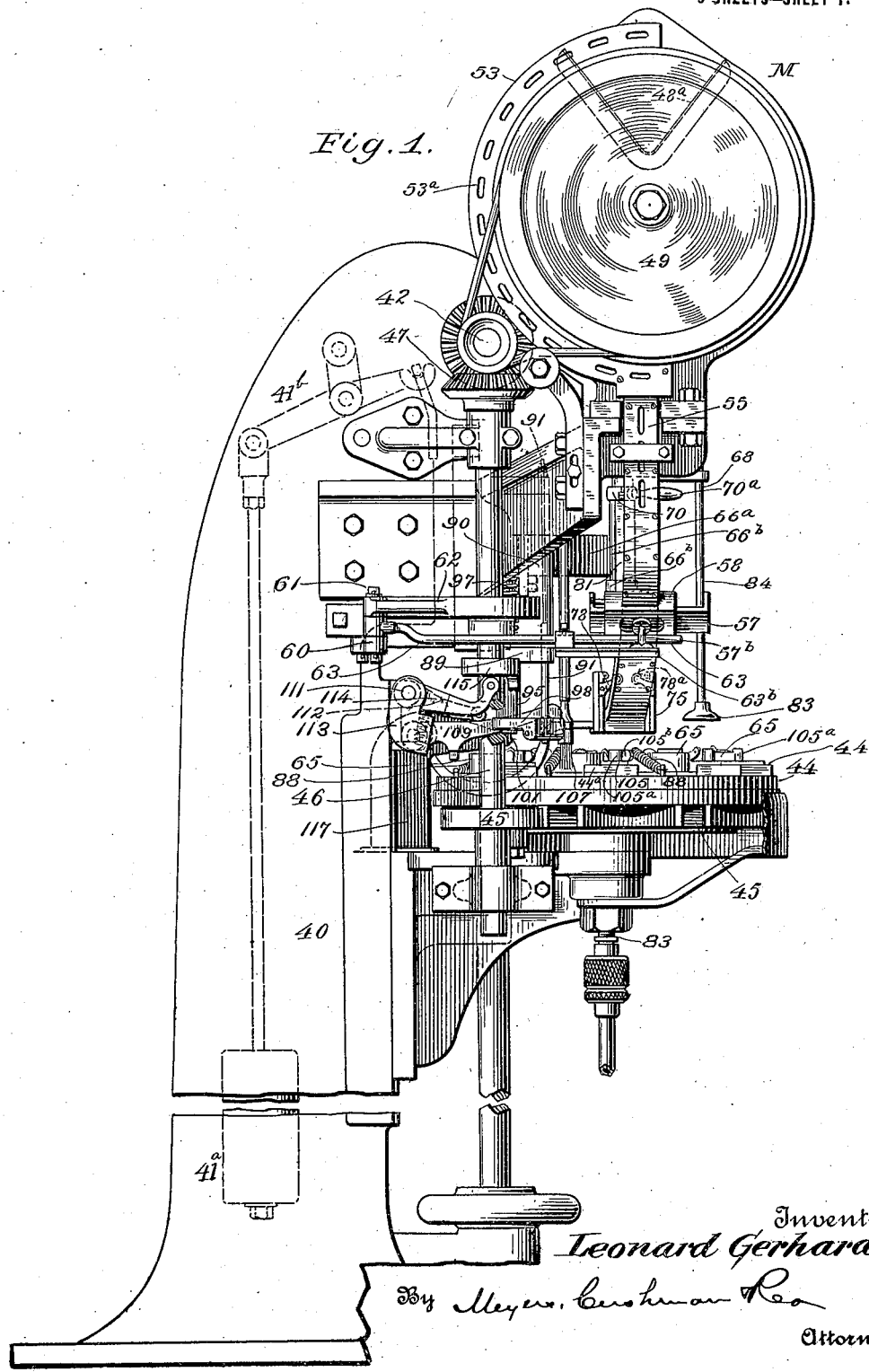

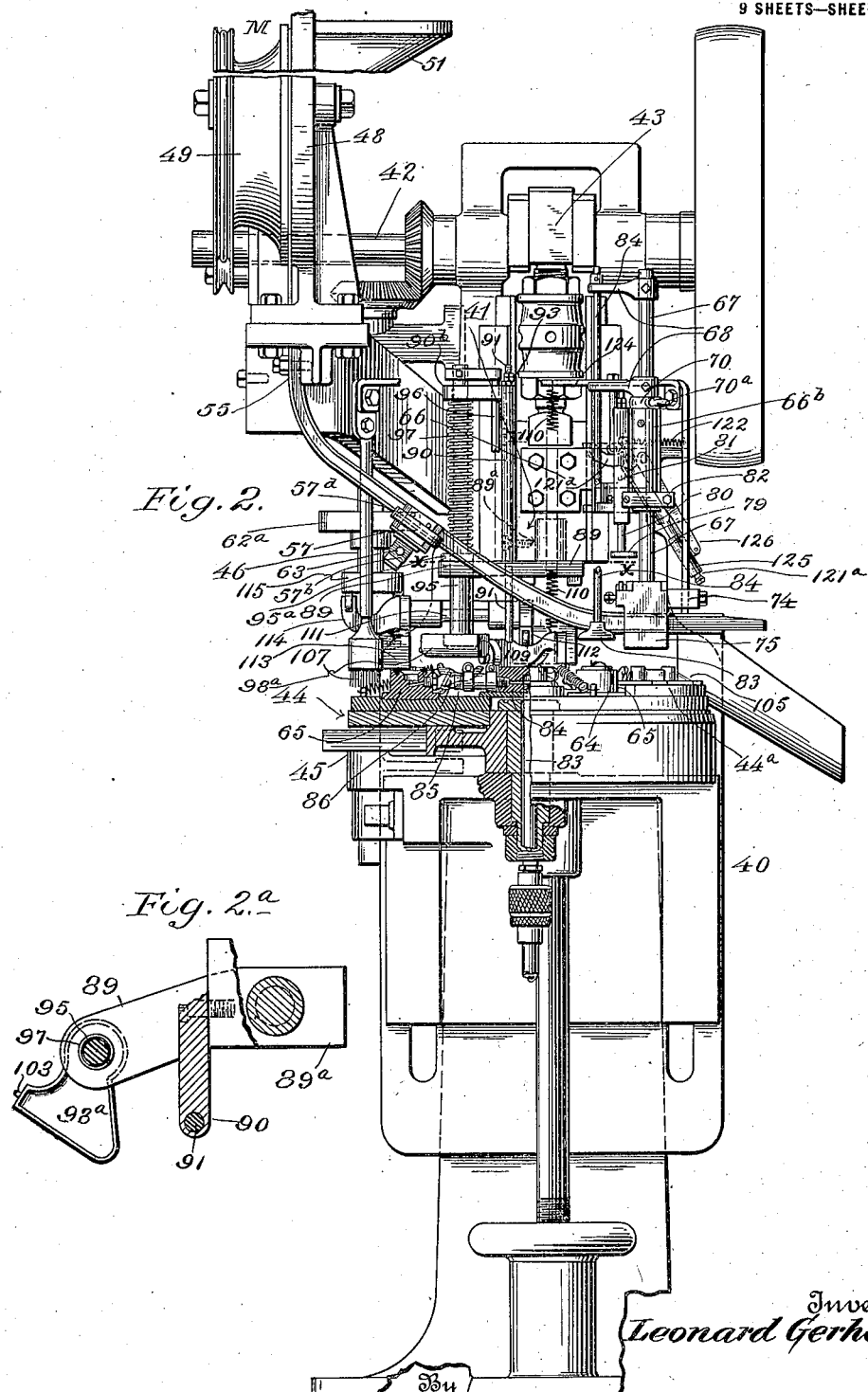

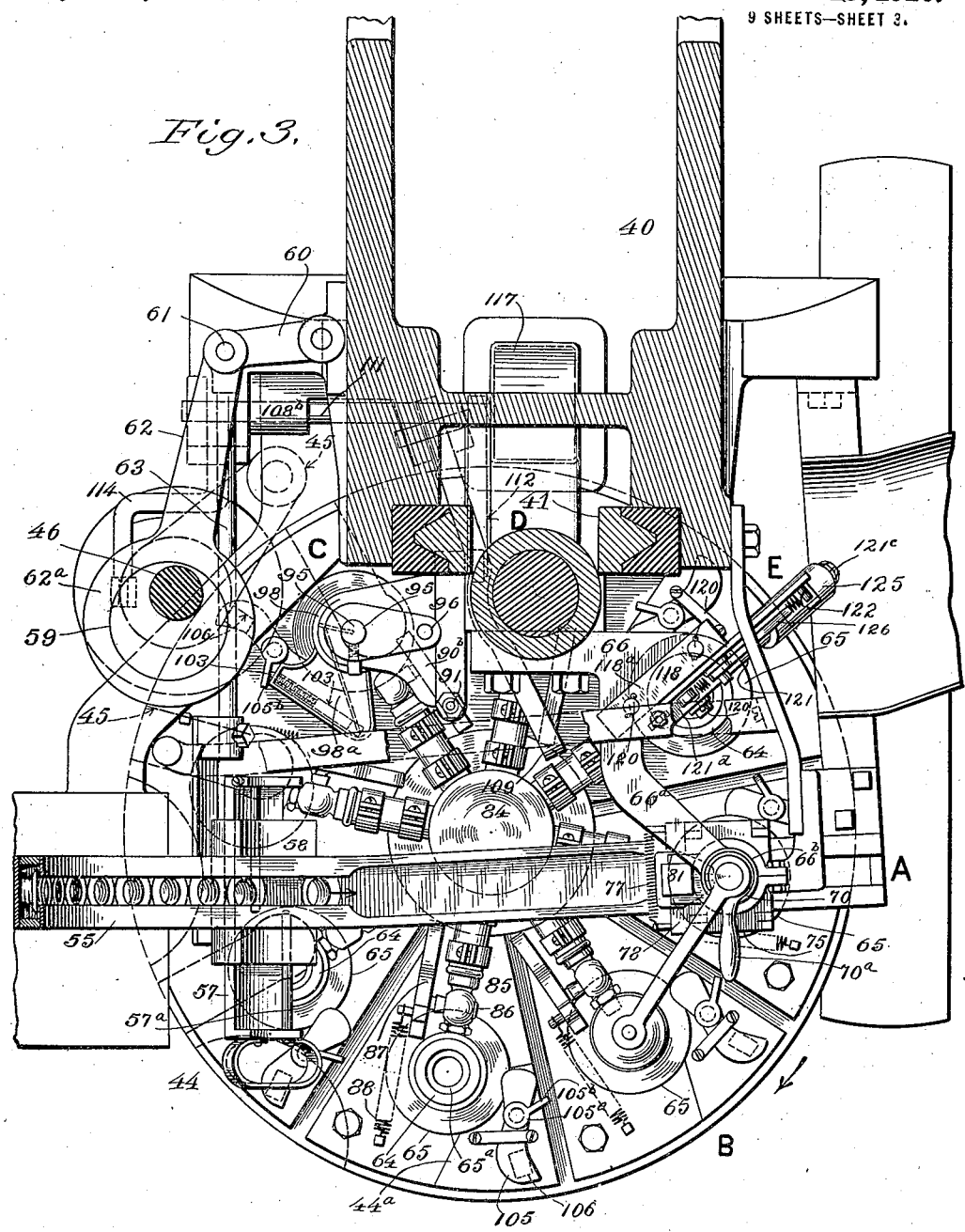

L. GERHARDT.
APPARATUS FOR TESTING THE LEAKAGE QUALITIES OF BLANKS.
APPLICATION FILED OCT. 23, 1917.

1,359,799.

Patented Nov. 23, 1920.

Inventor,
Leonard Gerhardt.
By his Attorneys,

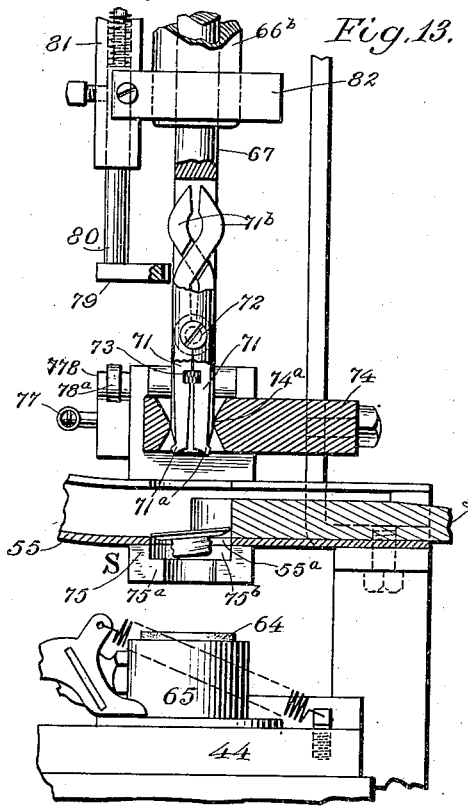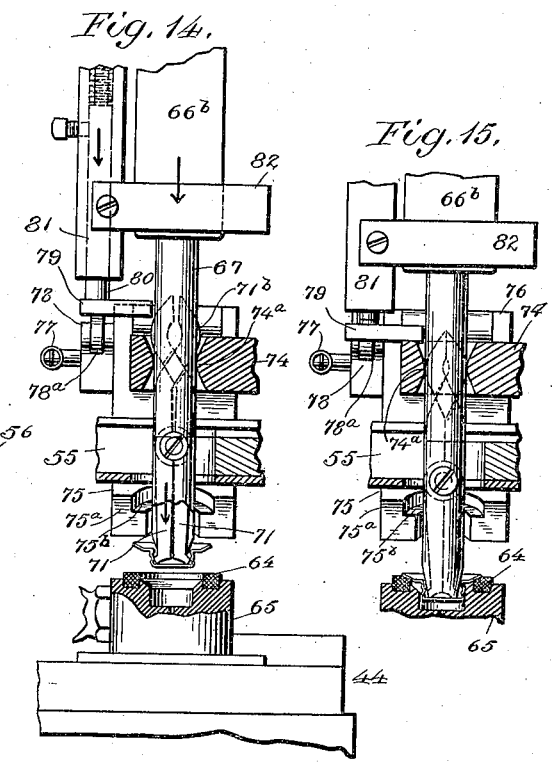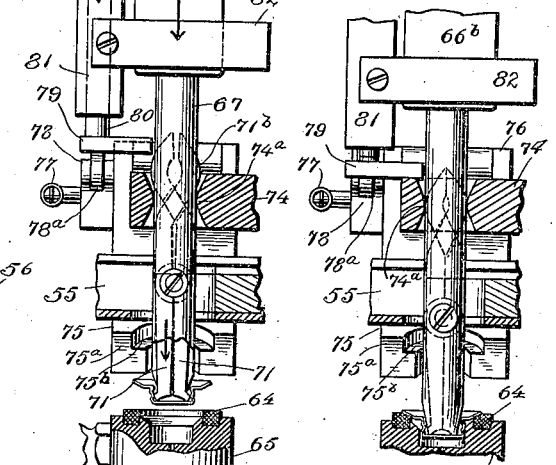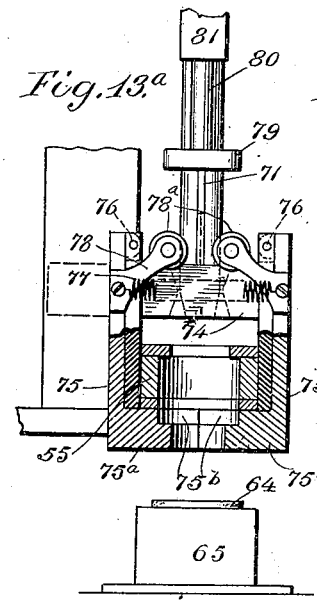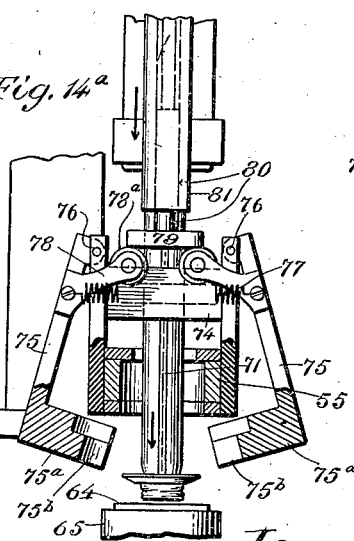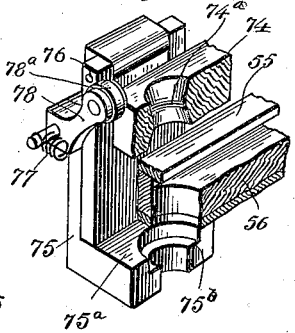

L. GERHARDT.
APPARATUS FOR TESTING THE LEAKAGE QUALITIES OF BLANKS.
APPLICATION FILED OCT. 23, 1917.
1,359,799.
Patented Nov. 23, 1920.
9 SHEETS—SHEET 7.
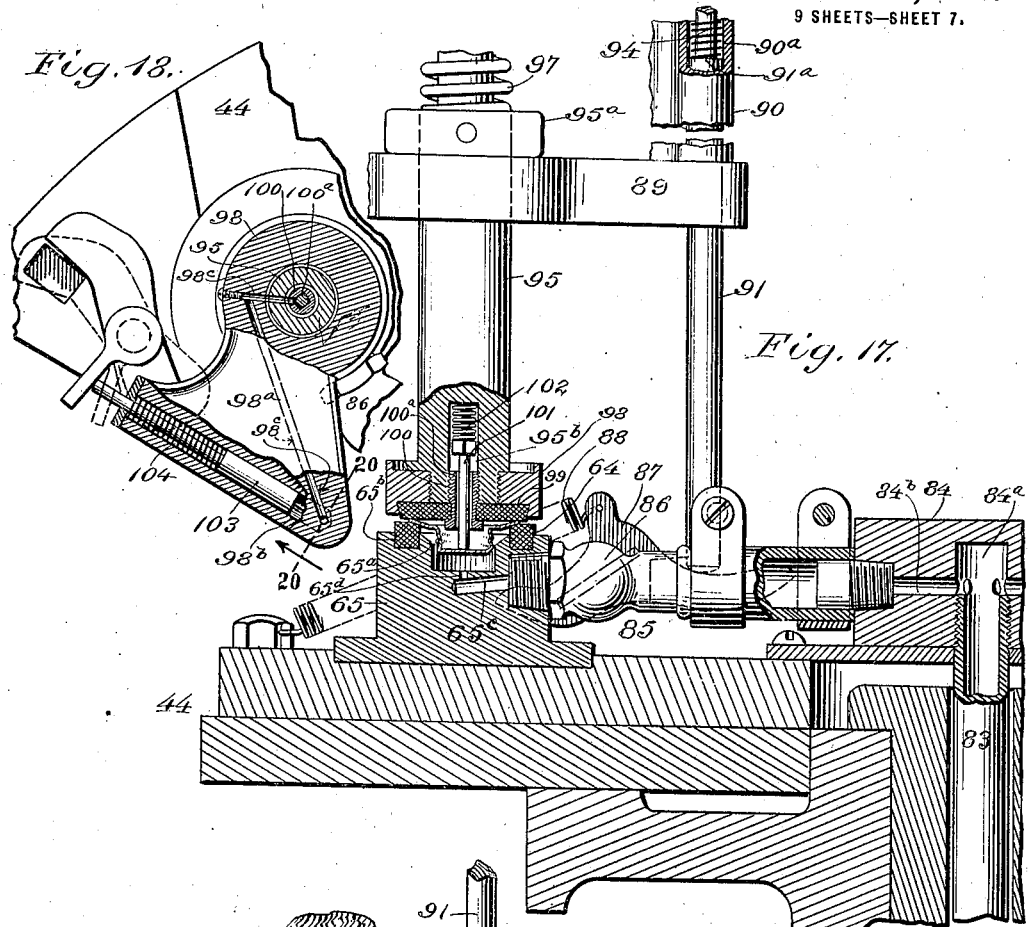
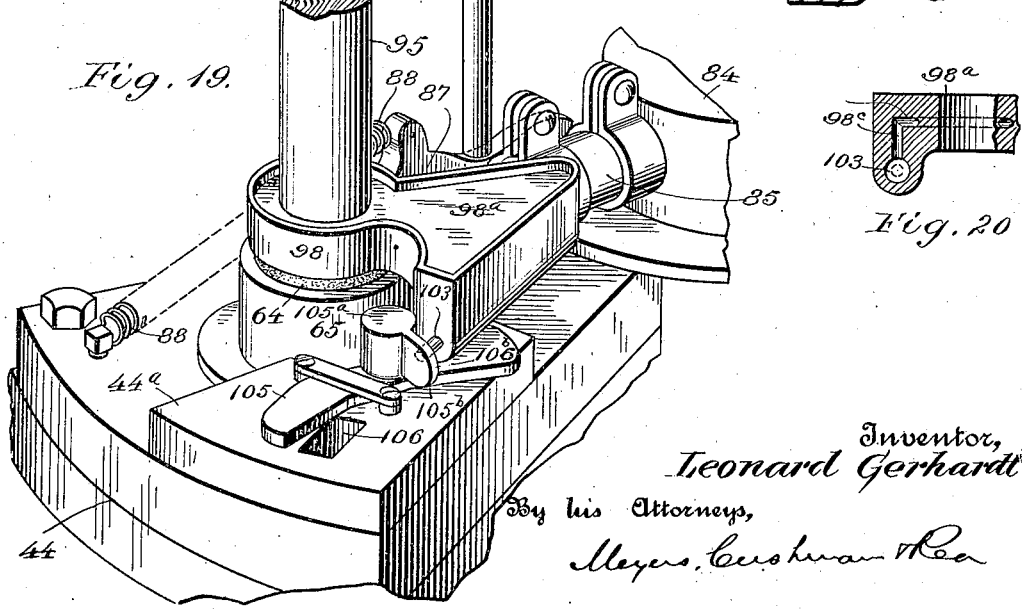

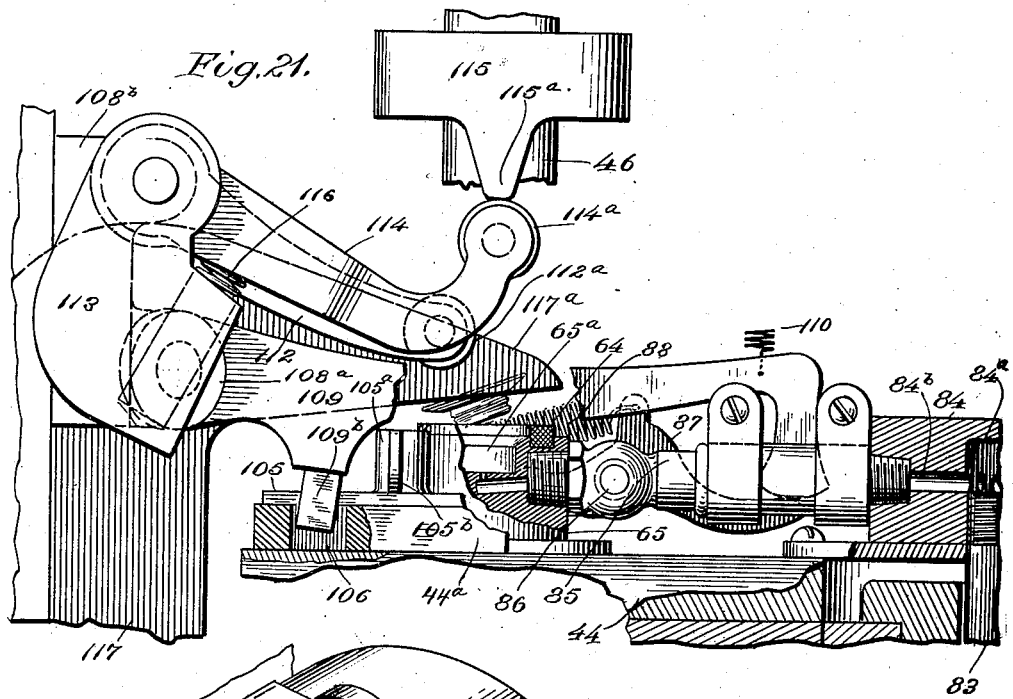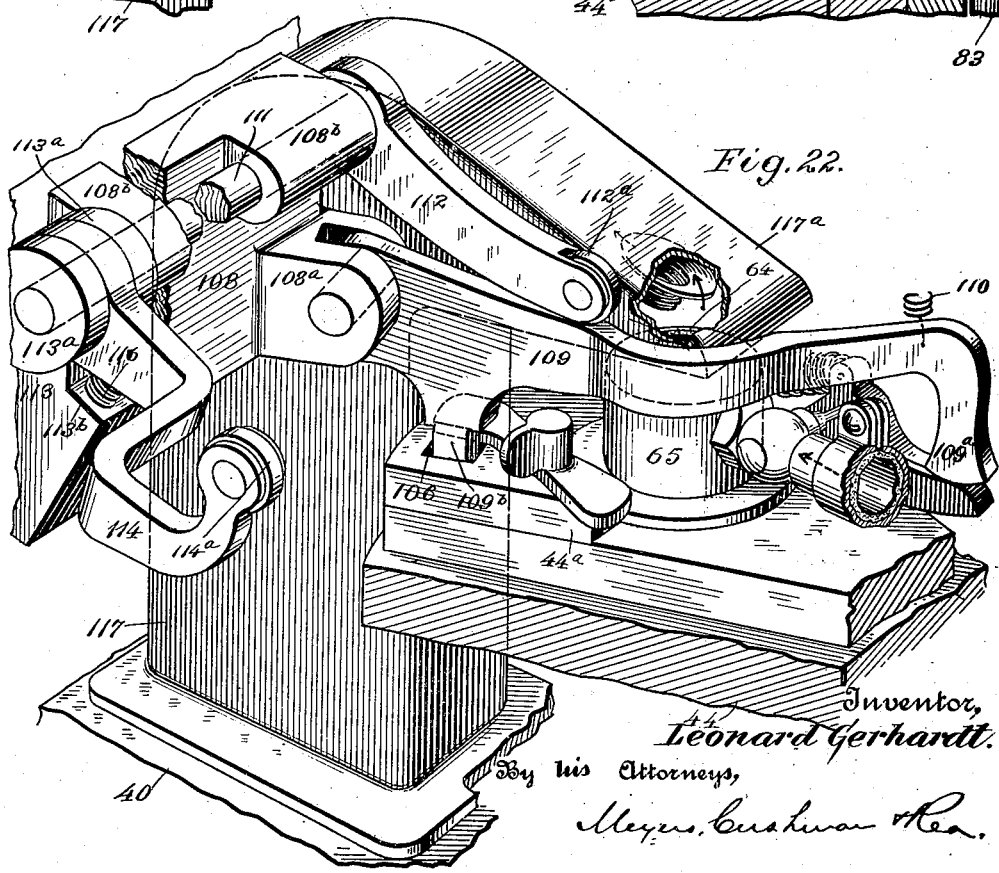

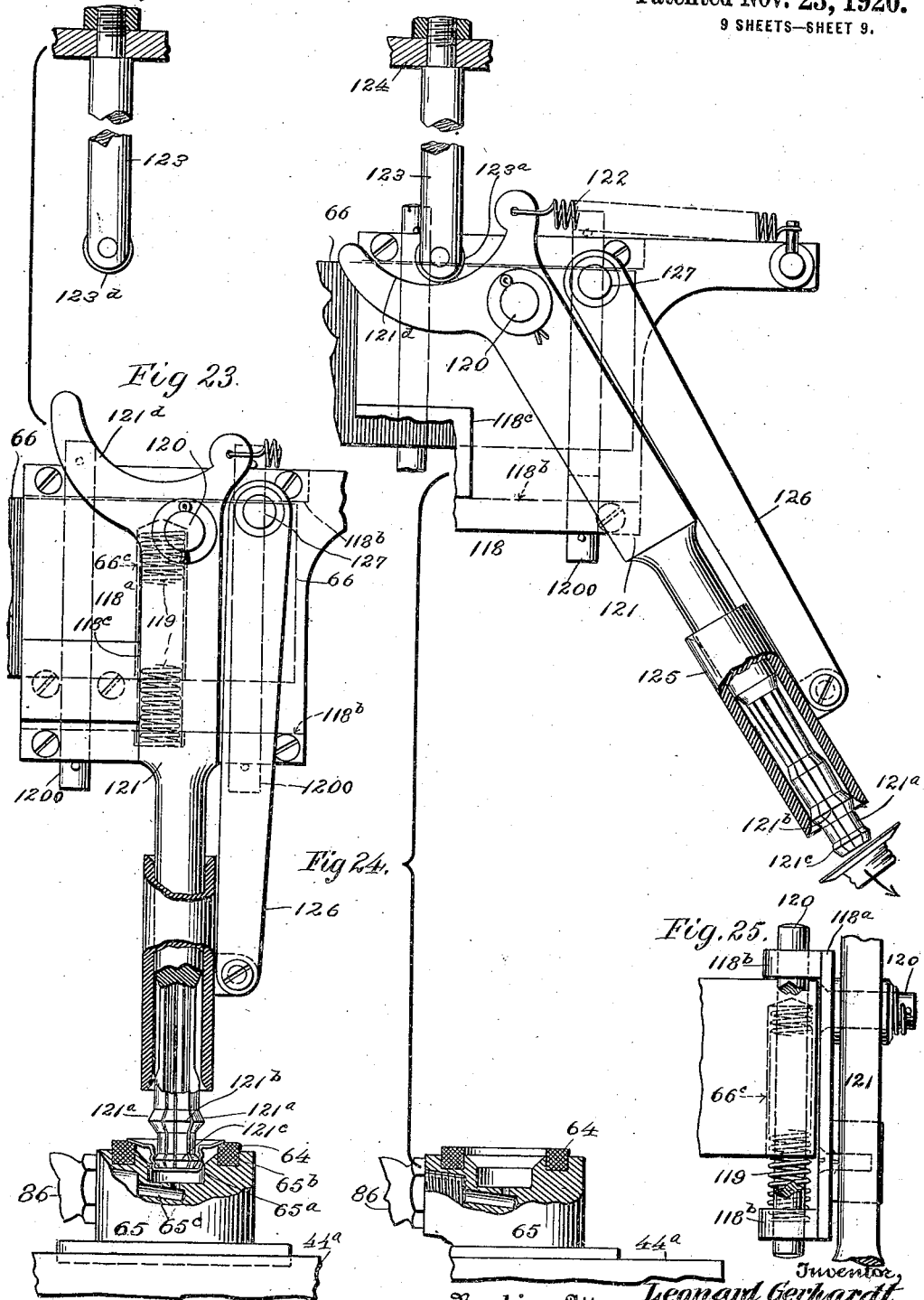

UNITED STATES PATENT OFFICE.

LEONARD GERHARDT, OF BALTIMORE, MARYLAND, ASSIGNOR TO TIN DECORATING COMPANY, OF BALTIMORE, MARYLAND, A CORPORATION OF MARYLAND.

APPARATUS FOR TESTING THE LEAKAGE QUALITIES OF BLANKS.

1,359,799.        Specification of Letters Patent.     Patented Nov. 23, 1920.

Application filed October 23, 1917. Serial No. 198,064.

*To all whom it may concern:*

Be it known that I, LEONARD GERHARDT, a citizen of the United States, residing at Baltimore, State of Maryland, have invented new and useful Improvements in Apparatus for Testing the Leakage Qualities of Blanks, of which the following is a specification.

This invention relates to improvements in leak-testing mechanisms, pertaining more particularly to mechanisms for this purpose adapted to provide for large capacity operations and automatically.

The present invention, while adapted for other uses, is designed more particularly for testing blanks, such, for instance, as screw caps for cans of various kinds. Caps for this purpose are of the imperforate type, remaining in such form until it is desired to initially open the can whereupon the can cap is punctured. The caps are formed with threaded portions to receive threaded covers, the latter, prior to puncturing of the cap, simply remaining over the cap, becoming serviceable only after the cap has been punctured.

These caps are formed in large quantities by suitable mechanism and, being formed from a single blank, are generally leakage-proof, but it has been found that imperfect caps are inevitably produced and since the caps are intended to be employed in connection with cans of imperforate character, it is practically essential that the imperfect caps should be discarded. Since it is often the case that imperfections in the cap are not discernible by the naked eye, it is desirable that the caps be tested in other ways prior to being secured in position on the can. Since this practically involves handling each cap separately, it will be readily seen that any attempt to provide the essential tests for each of the caps produced by a machine of large capacity, becomes a serious problem. In addition, the particular configuration is generally such as to prevent the use of the usual type of testing mechanisms.

This problem is solved by apparatus such as is disclosed herein, in which the various instrumentalities are so arranged that each cap is subjected to predetermined testing operations and automatically rejected or passed, the caps following each other in rapid succession so that the mechanism is capable of handling the output of large capacity forming machines.

The tests for this type of blank are made by air under pressure, each cap being individually subjected to a fluid pressure of greater value than that which the cap may be subjected to in use, the arrangements being such that a cap found imperfect as to leakage qualities—even though imperceptible—operates a suitable mechanism and prepares it for coöperation with discharge mechanism for removing the imperfect cap; on the contrary, if the cap is found perfect, the mechanism will act to maintain such discharge mechanism inactive, the perfect cap, then being discharged from the apparatus by separate discharging mechanism.

The objects of the invention are therefore the provision of mechanism for producing the proper testing and assorting of the tested caps automatically and under large capacity conditions.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views:

Figure 1 is a side elevation of one form in which the present invention may be provided.

Fig. 2 is a front elevation of the parts shown in Fig. 1 with parts shown in section and broken away for the purpose of illustrating interior parts.

Fig. 2$^a$ is a detail sectional view on line $x$—$x$ of Fig. 2.

Fig. 3 is a horizontal sectional view of the apparatus of Figs. 1 and 2, taken on a plane above the major portion of the apparatus, thus disclosing many of the parts in plan view.

Fig. 4 is a view in elevation, with parts broken away, of a hopper or magazine forming the supply for the testing apparatus.

Fig. 5 is a central vertical sectional view of parts shown in Fig. 4.

Fig. 6 is a detail sectional view indicating the manner in which the caps are automatically delivered from the magazine.

Fig. 7 is a detail sectional view indicating the manner in which the caps are supported during travel to the delivery chute.

Fig. 8 is a perspective detail of a portion of a guide wall.

Figure 9:
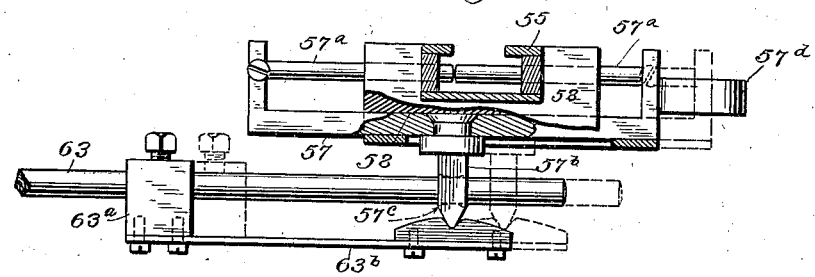

Fig. 9 is a sectional view taken transversely of the delivery chute and showing, in elevation and in section, a control mechanism for providing an escapement operation within such chute.

Figure 10:
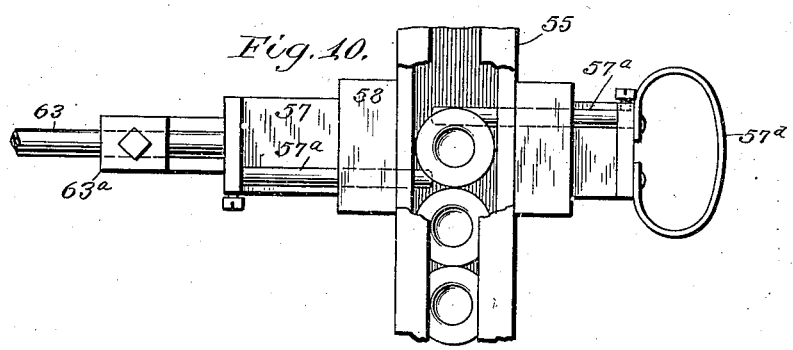
Figure 11:
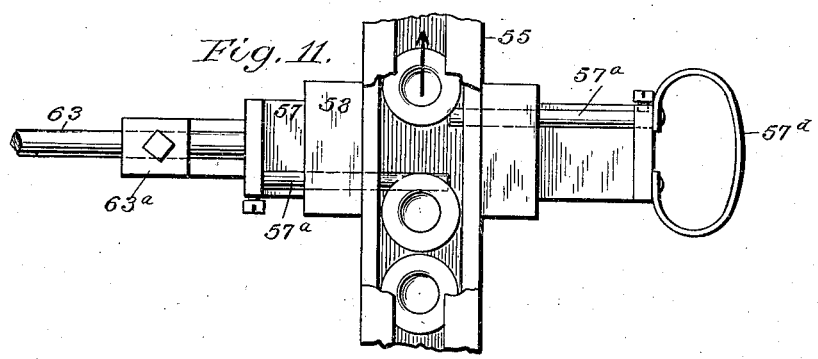

Figs. 10 and 11 are front elevations of the chute with the control or escapement mechanism shown in different positions, the particular direction of feed shown being due to the particular manner in which the operating parts are located in the general mechanism.

Figure 12:
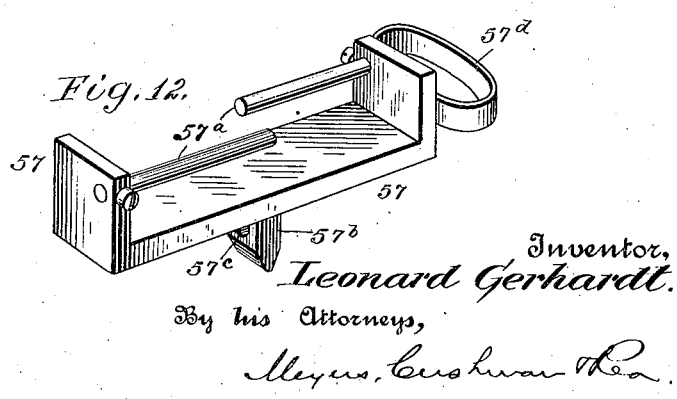

Fig. 12 is a perspective view of the escapement device removed from its operating position.

Fig. 13 is a view partly in elevation and partly in section showing the lower end of the delivery chute and the mechanism employed in positioning a cap on its testing seat.

Figs. 14 and 15 are similar views showing different positions of parts, Fig. 15 showing the cap as seated.

Figs. 13ª and 14ª are detail views partly in elevation and partly in section of the structures of Figs. 13 and 14 respectively, the views being taken at right angles to said Figs. 13 and 14.

Fig. 16 is a detail perspective view showing one of the swinging supports at the discharge end of the delivery chute.

Fig. 17 is a view partly in section and partly in elevation showing a cap at the testing station and undergoing the testing operation.

Fig. 18 is a view partly in plan and partly in section of a portion of the mechanism shown in Fig. 17.

Fig. 19 is a perspective view of parts shown in Fig. 17.

Fig. 20 is a detail sectional view taken on line 20—20 of Fig. 18.

Fig. 21 is a view partly in elevation and partly in section of mechanisms operative at the discharging station for leaky caps or blanks.

Fig. 22 is a perspective view, partly broken away, of parts shown in Fig. 21.

Fig. 23 is a view partly in elevation and partly in section of mechanism operative at the discharging station for test-proof caps, the discharging element being shown as having entered the cap to be discharged.

Fig. 24 is a similar view with the discharging element shifted and in the act of dropping the cap out of the machine.

Fig. 25 is a detail view partly in elevation and partly in section showing a safety device.

In the embodiment shown in the drawings, the blank being tested is an imperforate screw cap of the type shown in Fig. 22, the cap being formed automatically by suitable mechanism (not forming part of the present invention), the cap having its central portion depressed and shaped to provide the threads on to which the cover cap is adapted to be screwed, the cover cap not being disclosed herein as it is not necessary that it be tested.

In order to better understand the detail description, a brief general description of the cycle of operations is given.

During the actual testing, the cap is positioned as in Fig. 17, the flanges extending between clamping members adapted to provide a sealing contact therewith, the central portion of the cap extending downwardly as shown in said figure, the structural elements being arranged for operation with the cap in this position.

To provide for large capacity operations and to permit of complete automatic action, the testing and assorting operations are arranged to take place while the blanks—in the present embodiment shown as the screw caps—are supported on a turret-like structure mounted to have a step-by-step movement on a vertical axis, thus providing what may be considered as stations at which the specific operations take place, the turret having a number of similar blank-carrying members on its top, these members being spaced apart and arranged so that each blank passes through one of two cycles of operations while it is being carried on the turret. Another characteristic is the fact that the various instrumentalities are so arranged that the period during which action is had at each active station is concurrent at the several stations, so that the various operations can be provided and controlled by the reciprocating movements of a single element, the blank passing through the several active stations in succession, the arrangement being such that at each reciprocation of the actuating element, a blank is delivered to the turret and a blank is tested; similarly a blank is passed from the turret, either as a perfect or as an imperfect blank, for each reciprocation, although not necessarily with each such reciprocation.

The blanks are delivered to a magazine in any desired way and are taken from this magazine and delivered in succession to an escapement structure which releases the blanks at successive intervals—in synchronism with the testing operations—each blank passing to a point where it is delivered and positioned on one of the blank seats of the turret, this taking place at what may be termed the receiving station of the turret.

To permit of assurance being had of proper positioning of the blank, the advance of the positioned blank to the succeeding station may locate the blank beneath a member which is brought into contact with the blank and which will tend to correct any slight mispositioning of the blank.

The positioned blank is then advanced either directly or, as indicated in the drawings, through a number of inactive stations, to the testing station, where a clamping element is brought into contact with the opposite face of the blank to complete a sealing contact with the blank, after which compressed air is admitted for a short interval. If the blank is not free from leaks, even though small, a sufficient amount of air passes through the blank and, passing through a series of passages, becomes effective on a plunger which shifts a guard which controls a recess in the turret, the shifting movement uncovering this opening. If the blank is perfect, no leakage of air through the blank take place and no plunger movements will be had, the result being that the turret recess remains covered or guarded. The arrangement is such that these operations are completed rapidly, taking place while the actuating element is approaching one end of its reciprocation, the opposite movement of the actuating element releasing the sealed condition, the blank remaining on its seat. The succeeding movement of the turret carries this tested blank to a discharge station at which station the blanks found imperfect at the testing station are ejected from their seats. Excepting while undergoing test at the testing station the blanks are supported free from clamping action.

The ejecting action at the discharge station is by a blast of compressed air, this air being admitted to the under face of the blank only in the event that the blank was found imperfect, no air being admitted where the blank was found perfect at the testing station. Hence the ejecting action is controlled through control of the admission of compressed air at this station, and this control is provided by the position of the guard member referred to. If the completion of the cycle at the testing station causes the turret opening to be uncovered or unguarded, a member at the discharge station is permitted to move a distance sufficient to open a controlling valve to the compressed air supply, thus blowing the blank from its seat. If this turret opening was left covered or guarded in the testing station, the guard acts to prevent sufficient movement of this member to open the valve, leaving the blank on its seat at this station. Hence the cycle of operations at the testing station has determined whether or not activity is to be had at this discharge or ejecting station, the imperfect blanks being ejected at this station and the perfect blanks remaining in position and being advanced to a succeeding station—the blank discharge or delivery station—where a discharge or delivery mechanism is made active to grip the blank, raise it from its seat, and through a lateral swinging movement, throw the blank into a suitable channel or receptacle which takes it away from the apparatus.

At some point during travel of the turret, in advance of reaching the testing station, each guard member, after performing its function, is brought into the sphere of activity of a closing instrumentality, the latter being adapted to shift those guards which have been moved out of guarding position at the testing station, this instrumentality, of course, being ineffective on those guards which were not moved at such station.

Referring first to Figs. 1 and 2, 40 designates a frame which is somewhat of the type of a punch press frame, the frame carrying a cross-head 41 adapted to reciprocate in a vertical direction through the operations of a crank shaft 42, suitably driven, and a crank 43. If desired cross head 41 and the parts carried thereby may be counterweighted in any desired way, as by employing a counterweight 41ª connected by a pivotally mounted walking beam 41ᵇ and suitable linkage, to said cross head or parts rigidly connected thereto. The operating parts of the various instrumentalities are generally made active either through the movements of the cross-head or are operatively connected to shaft 42, the entire apparatus thus having its operations controlled by the movements of shaft 42.

For instance, the turret, indicated at 44, and having a vertical axis, is mounted rotatably on the frame and is given intermittent motion through suitable means such, for instance, as by the action of a mechanical movement of the type of the Geneva stop movement, the latter being indicated generally at 45, the constantly moving element being carried by a vertical shaft 46 operatively connected to shaft 42 by bevel gear connections 47, rotation of shaft 46 causing the turret to be advanced intermittently so as to move the blank seats of the turret successively to and through the various stations, the turret dwelling while the seats are located at the stations.

For the sake of clearness, a detail description of the several instrumentalities employed will follow the course of a blank from its entrance into the apparatus to its discharge either as an imperfect or a perfect blank.

Referring to Figs. 4 to 8 inclusive, M designates a magazine formed of a stationary member 48 carried by the frame of the machine, and a member 49 pivotally supported on a spindle 50 carried by member 48. Member 49 has a suitable cross-sectional configuration, such for instance as is shown in Fig. 5, this configuration producing the outer side wall and the periphery of a chamber M, the remaining wall of the chamber being formed by a face of member 48. Chamber m is adapted to receive the blanks from a suitable hopper 51 carried by member 48, said member having an opening 48$^a$ leading to the chamber.

Member 49 is rotated, in the direction of the arrow in Fig. 4, by a suitable drive connection with shaft 42, and carries a plurality of wings or vanes 52 which tend, during rotation of member 49, to break up any tendency of the blanks to become blocked and at the same time tend to produce a compartment-like effect in the chamber, enabling a freer movement of the blanks toward the discharge points of the chamber.

Member 48 is also formed with a projecting flange 49$^b$ extending parallel with the periphery of member 49 practically from the top of the member to its bottom (Fig. 4), said flange carrying a plate 53 which completes a channel m' external of member 49 and in communication with chamber m through the spaces provided in a flange 49$^a$ which opposes the face of member 48. The face of flange 49$^a$ is preferably of a more or less step type (Figs. 7 and 8), an arrangement which permits of the free passage of a blank from the chamber to the channel when the blank is presented to a space in its proper feeding relation. As member 49 rotates, the properly presented blank will pass through the space into channel m' when such passage is permitted by the absence of a blank in the channel opposite the space.

This ability to pass the blanks is limited to that side of the magazine on which member 49 is moving downwardly, the opposite side having suitable means to prevent escape of blanks which may pass into the space during the upward travel of flange 49$^a$. If desired, a yieldable member 54 (Fig. 4) may be mounted in the magazine to prevent escape of the blanks during the earlier portion of the downward travel of the flange, thus practically insuring that the blanks which have passed into the channel will readily and freely move in the direction of length of the channel and pass into the delivery chute 55 which leads from the end of such channel. Plate 53 may be provided with slots 53$^a$ to expose channel m' and enable any blocked blanks to be moved along the channel manually if desired.

As shown in Figs. 2 and 3, chute 55 extends downwardly and across the top of the turret, being spaced some distance above the latter. The chute may have any desired cross-section and structural form, and is provided at an intermediate point in its downwardly inclined portion with an escapement instrumentality of suitable form such, for instance, as shown in Figs. 5 to 12, the instrumentality operating to permit passage of blanks singly and intermittently, the escape being at a point where gravity will provide sufficient momentum to cause the blank to move to the end of the chute without liability of material rebound at such end, it being desirable that each blank be located and come to rest upproximately at a predetermined point in the chute. And to aid in securing this result I prefer to locate a permanent magnet structure—indicated at 56—at such chute end, said magnet tending to correct any material mispositionings of the delivered blank.

As shown in Fig. 12, the escapement structure comprises a U-shaped member 57 carrying pins 57$^a$, these pins projecting inwardly in parallel planes from the opposite sides of memebr 57 and being spaced apart a distance approximately the length of the outer diameter of the depressed portion of the blank, as shown for instance in Fig. 10. Member 57 is slidably mounted in a guide 58 carried by the chute (Fig. 9), said member being movable in directions transverse of the direction of length of the chute with pins 57$^a$ projecting into the channel of the chute. The arrangement is such that reciprocation of member 57 causes each pin to alternately enter into and pass out of the path of travel of the depressed portion, as shown in Figs. 10 and 11, these views showing the manner in which a blank is segregated from the succession of blanks being fed and permitted to escape past the escapement device.

Member 57 is reciprocated by the action of an eccentric 59 (Fig. 3) mounted on shaft 46 through the following connections:

60 indicates a member pivotally connected at one end to the machine frame and having its opposite end carried by a pivot 61 on which one end of a member 62 is mounted, said member 62 carrying the eccentric band 62$^a$ for eccentric 59. This arrangement provides a more or less toggle-like structure which operates to give pivot 61 approximately a reciprocating movement. Pivot 61 also carries a rod 63 (Figs. 1, 2 and 9), said rod extending beneath member 57 and preferably through an opening 57$^c$ formed in a downwardly projecting element 57$^b$ carried by member 57, said element preferably having its lower end wedge-shaped and adapted to engage in a complemental recess formed in a member carried by an arm 63$^b$ secured to a member 63$^a$ adjustably mounted on rod 63. By this arrangement, the movements of rod 63 provided by the eccentric action will cause member 57 to be reciprocated in its guide, the point of connection being provided by the engagement of member 57ᵇ with the member carried by yieldable member 63ᵇ, thus providing connections which are operative under ordinary conditions. Should, however, imperfect feeding take place in the chute, so that a blank might be located in the path of travel of one of the pins 57ᵃ during pin advancing movement, the resistance against pin advance would operate to cause member 57ᵇ to be disengaged from arm 63ᵇ, thus breaking the drive connection for member 57, the general arrangement providing for a safety factor in this respect.

As shown in Fig. 1, rod 63 extends from the left of the chute. For purposes of uniformity, this relation is maintained in the showing of Figs. 9 to 11. This presents the apparently anomalous condition of feeding a released blank upwardly by gravity, but it will be understood that the section of Fig. 9 is taken through the chute at a point above the escapement mechanism, and Figs. 10 and 11 are therefore plan views of parts shown in Fig. 9.

As it may be desirable to provide escapement operation manually, a handle 57ᵈ is connected to member 57.

From the above it will be understood that the blanks are delivered to the magazine where they form a bulk supply, are taken from this supply individually and introduced into a channel and then pass into the delivery chute where they form a succession of blanks above the escapement instrumentality. The latter releases the blanks one at a time, one blank being released with each rotation of shafts 42 and 46, the released blank continuing downward through the chute and coming to rest at a predetermined point at the chute lower end, this point being above an opening 55ᵃ adjacent magnet 56 and through which the blank is adapted to be passed by the positioning instrumentality now to be described:

Turret 44 is preferably provided with a plurality of blank seats 64, these seats being carried by pedestals 65 projecting above the plane of the turret. The pedestals are spaced apart at uniform distances from each other and from the axis of the turret, and may be of any desired number, the minimum being the number of active turret stations. In the drawings eight pedestals are shown, three of the stations being inactive, although it is assumed that each pedestal will receive its blank at the receiving station and carry it successively through the cycle of operations. The pedestal structure will be described in detail hereafter. For purposes of describing the presenting mechanism, it is sufficient to state that the top of the pedestal is provided with a central cavity 65ᵃ into which the depressed threaded portion of the blank freely extends (Fig. 17), the pedestal also having an annular groove 65ᵇ in which the seat 64 is secured, the seat being preferably of resilient material and extending above the top plane of the pedestal as shown in Fig. 17, the blank being adapted to freely rest on this seat and freely project into cavity 65ᵃ.

The presenting mechanism is designed to shift the blank from chute 55 to position on seat 64, and the mechanism for providing this action is shown in Figs. 2, 3 and 13 to 16 inclusive, the blank being placed in position on that seat which is located below opening 55ᵃ of the chute, the presenting or positioning action taking place while the turret is stationary. This position of the turret may be termed the receiving station and is indicated in Fig. 3 at A. The presenting mechanism or instrumentality shown in the drawings will now be described, it being understood that this particular form of the instrumentality is more particularly for use with the type of blank shown and would obviously be varied to meet the changed conditions which would be presented where a different form of blank or hollow article is being tested.

66 designates a bracket (Fig. 3) secured to cross-head 41 and movable therewith, said bracket having a forwardly projecting arm 66ᵃ which terminates in a sleeve-like portion 66ᵇ having its direction of length extending vertically with its axis in substantial vertical alinement with the axis of opening 55ᵃ and the blank seat which may be positioned below said opening. Sleeve 66ᵇ is adapted to receive a rod 67 which projects above and below said sleeve, said rod, above the sleeve, carrying a pair of arms 68 adjustable in the direction of length of the rod, which arms are adapted to support a member 83 active at the succeeding station and presently referred to. Arms 68 are spaced apart, and between sleeve 66ᵇ and the lower arm 68 I preferably mount a member 70 having a handle 70ᵃ. As presently described, rod 67 and parts carried thereby are simply supported on sleeve 66ᵇ without positive locking engagement between the sleeve and rod, the weight of the presenting instrumentality being sufficient to normally permit the instrumentality to follow the downward movement of sleeve 66ᵇ, member 70 forming the supporting element in contact with the upper end of the sleeve. This permits of relative movement between rod and sleeve longitudinally without affecting the movements of sleeve 66ᵇ. This is of advantage in that it permits of yielding of rod 67 and the parts carried thereby when necessary and also permits of more or less manual control of the rod movements should such control be found necessary. It is preferred that rod 67 be held against rotative movement in the sleeve, and this may be provided in any desired manner as by the use of a pin and slot arrangement, a spline, or by a suitable cross-sectional configuration.

The portion of rod 67 projecting below sleeve 66ᵇ is slotted to receive a blank-gripping device shown as in the form of two members 71 mounted within the slot of rod 67, these members being mounted on a pivot 72, the lower ends of the members generally extending in the same plane each being provided with a toe 71ᵃ, the toes of the members extending in opposite directions, as shown in Figs. 13 to 15. The members are normally held in separated position by suitable means, as for instance a spring 73. The upper ends of members 71 are crossed and have portions 71ᵇ which normally project outward beyond the face of rod 67 (Fig. 13).

Downward movement of rod 67 carries the lower ends of member 71 into contact with the blank positioned above opening 55ᵃ, the advancing movement of the rod carrying the blank downward through the opening and on to a blank-supporting device, indicated generally at S positioned beneath opening 55ᵃ, this device being formed as presently described and having a seat on which the annular flange of the blank may temporarily rest. As rod 67 continues its downward movement the toes 71ᵃ will enter the blank depression (the members moving inward during this operation against the action of spring 73) the result being that toes 71ᵃ will engage the interior of the blank threads to form an efficient gripping contact with the blank. At this time, the blank supporting device S is opened, as presently explained, permitting free passage of the blank—now supported on toes 71ᵃ—toward seat 64. As the blank approaches its seat, parts 71ᵇ of member 71 pass into engagement with the inclined walls 74ᵃ of a stationary member 74, this contact tending to move the toes inward to release the toes from the blank, this released action taking place at the time when rod 67 is at the lower end of its downward stroke. Figs. 14 and 15 indicate different positions of the gripping device to illustrate the action of member 71. During the return stroke of rod 67, this contact between parts 71ᵇ and walls 74ᵃ is maintained for a sufficient length of time to permit toes 71ᵃ to pass out of the blank depression, leaving the blank in position on its seat. Member 74 is adjustable so as to permit accurate timing of the retracting movements of member 71.

Supporting device S comprises a pair of members 75, one of which is shown in perspective in Fig. 16. Each member is pivotally supported on a frame carried by member 74, the pivot point being indicated at 76 Each member is also provided with an inwardly projecting portion 75ᵃ having a semi-circular recess 75ᵇ, the upper portion of the recess being of greater radius than that of the lower portion, said recesses combinedly forming a configuration adapted to support the blank as the latter passes from the chute. The two members 75 are located on opposite sides of the chute, the portions 75ᵃ extending under the latter in such way as to locate the axis of the combined recess 75ᵇ in axial alinement with opening 75ᵃ. Members 75 are normally held in this position by a spring or springs 77. Each member also carries an inwardly projecting arm 78, preferably having a roller 78ᵃ, the two rollers being located in the path of travel of a plate 79 located on the lower end of a rod 80, said rod being yieldably supported in a sleeve 81 carried by a plate or collar 82 mounted on sleeve 66ᵇ. This arrangement causes sleeve 81 to move in unison with sleeve 66ᵇ, and during the downward movement of these sleeves, plate 79 passes into contact with roller 78ᵃ with the result that continued movement of plate 79 operates to open members 75 from the position shown in Fig. 13ᵃ, to that shown in Fig. 14ᵃ, this opening action being against the tension of spring 77, the yielding support of rod 80 permitting the latter to move in sleeve 81 as may be desired. This opening action takes place after the blank has been gripped, as heretofore explained, permitting the blank to pass downward to its seat. During the return stroke of sleeve 66ᵇ, the movement of plate 79 permits member 75 to again close under the action of spring 77.

This operation completes the cycle at station A, placing the blank onto its seat. The turret is then advanced, locating this blank beneath a member 83 carried at the lower end of a rod 84 supported by arms 68, thus causing member 83 to have its movements in unison with the movements of rod 67. Member 83 may be omitted, if desired, but when employed tends to straighten the cap which had been positioned at station A, should such blank have been improperly positioned or materially shifted when the gripping device was being released. For identifying purposes, this point in the travel of the blank may be considered as station B, this straightening action taking place on one blank at the same time another blank is being positioned at station A on the succeeding pedestal.

The next station at which action is had in connection with the positioned blank is what may be termed the testing station, this station being indicated at C in Fig. 3. As will be seen from this figure, the blank is carried through three intermediate stations before reaching the testing station, these intermediate stations being inactive stations, no work being performed at these stations, and may, if desired, be omitted by properly arranging the active stations and limiting the number of pedestals to one for each active station. However, the particular embodiment shown in the drawings includes these inactive stations, and since the blank is exposed at these stations, it will afford an opportunity for the operator to note the general operation of the instrumentalities at stations A and B as well as permit straightening of such blanks as may have been mispositioned to such an extent as would prevent member 83 from correcting; it will also permit the operator to detect blanks which otherwise are faulty in structure and remove them before reaching the instrumentalities at the succeeding active stations.

Testing of blanks is had by subjecting the blank to the action of fluid pressure while the blank is held to its seat, the fluid being admitted to cavity 65$^a$ beneath the blank, the integrity of the latter being indicated by its ability to prevent leakage of the fluid through the blank. To provide for controllable admission of fluid to a cavity at the testing station, suitable mechanism is employed, the particular type used in the present embodiment being more particularly indicated in Figs. 1, 2, 3 and 17 to 20 inclusive.

Referring to Fig. 17, the support for turret 44 carries an axially extending pipe or conduit 83 connected up to a suitable source of fluid supply under pressure, as for instance a compressed air supply, this pipe being connected to a member 84 located centrally on the turret. Member 84 has a cavity 84$^a$ with which pipe 83 is in open communication, and is also provided with a plurality of radially extending channels 84$^b$, these channels corresponding in number to the number of pedestals 65. Each pedestal is formed with a channel 65$^c$ below cavity 65$^a$, the cavity and channel being in communication through a port 65$^d$. Channel 65$^c$ of a pedestal is connected to one of the channels 84$^b$ of member 84 by a connection indicated generally at 85, this connection including a valve 86 of suitable type, that shown in the drawings being of the butterfly type and having an operating arm 87 which extends inwardly toward member 84. Valve 86 is normally held closed by a spring 88. As long as valve 86 remains closed, fluid is not admitted into cavity 65$^a$. When, however, arm 87 is rocked downwardly, valve 86 is opened and cavity 65$^a$ is placed in open communication with cavity 84$^a$. Obviously each of the connections may thus be placed in communication with the source of fluid pressure supply. By means of the valve structure, however, this pressure is made active in a cavity 65$^a$ only at predetermined periods, one of which is provided at the testing station by suitable mechanism. This mechanism, however, is made active only after the blank has been clamped to its seat in order to withstand the pressure when admitted. To control the time of valve opening, both the clamping mechanism and the valve operating mechanism are rendered active by a common mechanism now to be described:

Referring to Figs. 1, 2, 2$^a$ and 3, 89 indicates a plate member (Figs. 2 and 17) secured to the under face of the cross-head and preferably having a stud 89$^a$ projecting into an opening formed in the cross-head, this plate member having an irregular contour as seen in Fig. 2$^a$. 90 indicates a verticaly extending member secured to a side of the cross-head, said member 90 being located above plate member 89 (Figs. 1 and 17). Member 90 projects outwardly to locate a vertically extending opening 90$^a$ above a point at which a portion of lever 87 is located when at the testing station. Opening 90$^a$ is adapted to receive a rod 91 which is of a length greater than the length of member 90 and is formed with a shoulder 91$^a$ (Fig. 17); this shoulder being normally located at a point intermediate the ends of opening 90$^a$. The upper end of opening 90$^a$ carries a threaded bushing which loosely surrounds rod 91, the upper end of said rod extending through the bushing and having its exposed end provided with lock nuts 93. A spring 94 encircling rod 91 between shoulder 91$^a$ and bushing 92 tends to normally retain the rod in its lower position. The lower end of rod 91 extends downwardly through an opening in plate member 89 and has a projecting length sufficient to bring its lower end in contact with the lever 87 which may be located beneath it, this contact being provided during the downward travel of the cross-head, the continued movement of the cross-head causing said rod to move the free end of lever 87 downwardly against the tension of spring 88, thus opening valve 86. Spring 94 provides for yielding or rod 91 under excessive pressure, it being understood that springs 88 and 94 are relatively arranged so as to provide for efficient operation of the lever without liability of damaging operating parts. During the return movement of the cross-head, rod 91 will be withdrawn, and valve 86 will be closed through movement of lever 87 under the action of spring 88.

95 designates a verticaly extending rod-like element supported in plate member 89 and a laterally projecting plate 90$^b$ carried by the upper end of member 90, said element being loosely supported by member 89 and plate 90$^b$, passing through openings in these parts, said element carrying a collar 95$^a$ above plate member 89 (Figs. 2 and 17), said collar normally resting on member 89. The upper end of element 95 carries a guide member 96 which has an arm loosely mounted in an opening in plate 90ᵇ, this guide member structure acting somewhat in the nature of a feather in preventing rotative movements of element 95. Mounted on element 95 between collar 95ᵃ and plate 90ᵇ is a spring 97 which tends to retain collar 95ᵃ in contact with member 89 but permits yielding of the element for a purpose presently described.

Referring more particularly to Figs. 17 to 20, element 95 extends downwardly below member 89 and has its lower end formed with an axially extending recess 95ᵇ. Said lower end also carries a member 98 having an external configuration shown more particularly in Fig. 19, said member carrying a resilient washer-like member 99, this member 99 forming the clamping member for the blank in opposition to the blank seat 64.

As heretofore pointed out, element 95 is yieldingly supported in the carrying frame provided by members 89 and 90. When therefore, downward travel of the cross-head moves this carrying frame to a point where washer 99 contacts with the blank which is in position on the pedestal, the continued downward movement of the cross-head simply moves the carrying frame downward while element 95 remains stationary, this downward movement, however, increasing the tension of spring 97 and thus more firmly retaining the washer in its clamping position. Obviously, the washer will be retained in position during the return movement of the cross-head until collar 95ᵃ is again seated on member 89, whereupon the washer will be withdrawn from contact.

It will be understood, of course, that the parts are so arranged that washer 99 will have an efficient clamping action on the blank before rod 91 begins its valve opening movement. Since collar 95ᵃ will have practically moved from out of contact with member 89 before this occurs, it will be readily understood that during the return travel of the cross-head, rod 91 will be withdrawn sufficiently to permit valve 86 to close before washer 99 leaves its seat.

The entrance to recess 95ᵇ is restricted by a bushing 100 threaded to element 95 and extending through washer 99 (Fig. 17). Bushing 100 is provided with an opening 100ᵃ non-circular in cross-section, being preferably of square contour. 101 designates a pin having a length greater than the length of bushing 100 and which is provided with a head located within recess 95ᵇ, the pin differing in cross-section from the cross-section of opening 101ᵃ, the cross-sectional contour of the pin being preferably circular. Pin 101 is yieldably supported against endwise movement by a spring 102 which tends to retain the head of the pin in contact with the inner end of the bushing, the latter forming a shoulder for this head. This causes the other end of the pin to be normally projected beyond the outer end of the bushing, the length of projection being such that the outer end of the pin passes into contact with the blank prior to the time washer 99 contacts with the blank, spring 102 permitting the pin to yield during the remainder of the downward movement of element 95.

Pin 101 will act to retain the blank on its seat as the washer approaches the blank. It also serves a function during the return movement of the cross-head as presently described.

The elements described are those which are active when the blank being tested is perfect. In such case admission of air into cavity 65ᵃ by opening valve 87 after the blank has been clamped, places the pressure of this air on the under side of the blank, and since the blank is held positively by the resilient clamping members, an imperforate condition of the blank prevents leakage of air through any part of the blank, the completion of the downward travel of element 95 leaving the entire testing pressure as contained within the cavity beneath the blank. The upward travel of the carrying frame of element 95 and rod 91 then closes valve 86, leaving this pressure within the cavity until element 95 reaches a position where washer 99 begins to leave its clamping position, at which time the head of pin 101 is some distance above the inner end of bushing 100. As a result, the blank is then held to its position simply by the pressure of spring 102, and this pressure being less than that of the pressure within the cavity, the greater pressure in the cavity will tend to move the blank from its seat 64 sufficient to bleed the cavity without, however, permitting the blank to be shifted from its position, this being due to the fact that pin 101 still bears on the blank and retains it in its general position. As a result, the blank will be practically freed from the pressure in the cavity by the time pin 101 passes out of contact with the blank, thus leaving the blank freely resting on its seat in the position at which it was brought into the testing station.

Where the blank being tested is found imperfect and permits leakage of the air when introduced in this manner, this air which passes through the blank reaches the cavity on the upper side of the blank (produced when washer 99 completes its clamping engagement). This leakage air passes into recess 95ᵇ through the passageway or passageways formed by the dissimilar cross-sectional configuration of the interior of bushing 100 and the exterior of pin 101.

As shown in Figs. 18 to 20, member 98 is formed with a laterally projecting portion 98ᵃ carrying a plunger 103 made yielding by a spring 104, said plunger being movable in an opening or channel 98$^b$ formed in the projecting portion 98$^a$. The inner end of opening 98$^b$ is in communication with recess 95$^b$ or a passageway leading thereto by a series of channels 98$^c$. This arrangement is such that the leakage air passes through channels 98$^c$ into opening 98$^b$ in opposition to plunger 103, causing the latter to be moved longitudinally in a direction to advance its outer end—exposed beyond portion 98$^a$—placing spring 104 under tension. As will be understood, spring 104 is of a tension which will permit of this movement of the plunger under comparatively small amounts of air leakage, but sufficient to return the plunger after the air pressure has been released. It will be understood, of course, that after washer 99 has passed out of contact with the blank during the upward travel of the cross-head, opening 98$^b$, channels 98$^c$, chamber 95$^b$ and the passageways through bushing 100 are open to the atmosphere.

This longitudinal movement of plunger 103 serves to shift the position of a guard 105 which, at the beginning of the testing operation, overlies a recess 106 positioned at the top of turret 44, the drawings showing it as formed in a plate 44$^a$ located on top of the turret. Guard 105 is pivotally supported on plate 44$^a$ and is provided with a vertically extending member 105$^a$ carrying a wing 105$^b$ which is located in the path of travel of the exposed end of plunger 103.

When, therefore, the presence of an imperfect blank on the pedestal at the testing station has been detected by the leakage of air therethrough, the resultant movement of plunger 103 serves to shift guard 105 from the position shown in dotted lines in Fig. 18 to the position shown in full lines in said figure, the completion of the testing operation, by closing valve 86, leaving the guard in the full line position.

Each pedestal has an individual guard, and each guard is in the position shown in dotted lines in Fig. 18 when the pedestal moves to the testing station. If the blank being tested is a perfect blank so that no leakage of air takes place, guard 105 will remain in this position and retain recess 106 covered or guarded, since the mechanism for moving the guard is not brought into activity. When, however, an imperfect blank is present, the leakage of air operates these various parts to shift the guard and uncover said recess 106 which remains in its shifted position for a purpose presently described.

In order to return the shifted guards to their guarding or covering position, any suitable means may be employed, as for instance a brush 107 (Figs. 1 and 2), preferably located at some point in the path of travel of the guards between the point where the guard shifting action has been made effective as a control factor and the point where the guard enters the testing station. In the drawings this is shown as being located at a point in proximity to the testing station so as to insure that all guards are in their proper position in entering such station.

As heretofore indicated, the invention is designed not only to test the blanks but also to provide a separation or assorting of the perfect blanks from those which have been found to be imperfect, the imperfect blanks being collected at one station and the perfect blanks at another station. The discharging stations for the two classes of blanks in the travel of a pedestal are respectively the discharge station for the imperfect blanks (station D) and the discharge station for the perfect blanks (station E).

The selection of the station at which a blank is to be discharged is provided at the testing station, the controlling element being the guard 105 which, in the full line position of Fig. 18, permits the discharging mechanism at the imperfect blank discharge station to become active to discharge the blank from the pedestal; with guard 105 unshifted—the dotted line position of Fig. 18—this discharge mechanism at the imperfect blank discharge station is held inactive, permitting the blank to remain on the pedestal and be carried to the perfect-blank discharge station, where the mechanism of that station will remove the blank from its pedestal and discharge it, the mechanism at this latter station having its complete cycle of mechanism operations provided with each pedestal presented at the station, being effective, of course, only with those tested blanks which have reached this station.

Since the station in succession to the testing station—station D—is that for the discharge of the imperfect blanks, it will be assumed, for purpose of explanation, that the blanks have been found imperfect at the testing station and that guard 105 has been moved to uncover recess 106. These conditions, when station D is reached, permit an element at such station to operate lever 87 to again open valve 86, this action permitting the entrance of the compressed air into cavity 64 against the under side of the blank. Since the blank is not clamped at this station, this admission of the air under pressure forces the blank from its seat and into a chute which carries it to a suitable collecting point. The mechanism for providing this operation is shown more particularly in Figs. 1, 2, 3, 21 and 22 and is now described.

108 designates a bracket secured to the frame of the machine and which carries ears 108$^a$, these ears being adapted to receive the pivot for a lever 109 projecting outwardly with a configuration approximating that indicated in Fig. 22, and which is provided with a down turned end or arm 109ª which is positioned above lever 87 of the pedestal which may be located at this station, the configuration of lever 109 being such that the turret may have free movement beneath this lever and locate the free end of the lever beneath arm 109ª. This lever 109 also carries a projection or finger 109ᵇ which is positioned at such point so as to enter recess 106 in case the recess is uncovered by guard 105, as indicated in Fig. 21. Should this recess 106 be covered by the guard, (as in the dotted line position of Fig. 17) the end of the projection or finger 109ᵇ will contact with guard 105 and prevent downward movement of lever 109 to an extent sufficient to cause valve 86 to open. When, however, projection or finger 109ᵇ is permitted to enter the recess 106ᵇ, lever 109 is moved a distance sufficient to rock lever 87 and open valve 86 to permit entrance of the air into cavity 64.

Lever 109 is supported at its forward end by a spring 110 (Fig. 2) which normally retains the lever in raised position. The downward movement of lever 109 is provided by suitable mechanism, the following description being that of the form shown in the drawings:

111 designates a rock shaft supported in ears 108ᵇ of bracket 108, this shaft having at one end an arm 112 extending forwardly to a position above lever 109 and preferably having at its free end a roller 112ª which is in contact with said lever 109. The opposite end of shaft 111 is provided with a member 113 having ears 113ª secured to the shaft and also having a shoulder 113ᵇ below the shaft axis. Loosely mounted on shaft 111, preferably between ears 113ª, is an arm or lever 114 of irregular shape and which projects forwardly to a point where its free end—preferably carrying a roller 114ª—is located to coöperate with a cam 115 mounted on shaft 46. Arm or lever 114 is yieldingly supported by a spring 116 which extends between this arm or lever and shoulder 113ᵇ. Cam 115 is provided with a high point 115ª effective in providing a sharp and rapid downward movement of arm or lever 114, the lever being maintained in this downward position for a short period and then permitted to return to normal position.

As will be readily understood, downward movement of lever 114 will tend to move member 113 through the spring connection between these parts. This movement of member 113 will, through its connection with shaft 111, move arm 112 downward, when lever 109 is permitted to have its full length of movement by the entrance of finger 109ᵇ into recess 106. However, should recess 106 be guarded, lever 109 will be prevented from moving downwardly, thus preventing complete downward movement of arm 112, the result being that member 113 is practically held from movement, and the movement of arm or lever 114 will simply compress spring 116, thus permitting of the operation of cam 115 and arm or lever 114 with each revolution of shaft 46, but the movement of lever 109 and arm 112 is made dependent on the position of guard 105. This particular mechanism therefore permits of proper operation under either condition without liability of damage to parts.

117 indicates a chute having a forwardly extending portion 117ª with a mouth open above the blank when the pedestal is in this station D. This chute is of any desired configuration, and is designed in such manner that the air beneath the blank, introduced suddenly and under pressure will practically blow the blank from its seat into this chute with sufficient power to carry it to a point where it may drop into a suitable collecting structure. In this connection, the fact that lever 114 is moved downwardly with rapidity under the action of cam 115 becomes of value, in that valve 86 is opened quickly and thus practically introduces the full force of the air into the cavity below the seated cap.

From the above it will be understood that the discharge of a blank from its pedestal at station D is determined at station C—the testing station—through the activity or inactivity of plunger 103. A blank found imperforate at station C prevents the supply of air necessary to give plunger 103 its movement and leaves guard 105 in its guarding position. When the pedestal advances to station D, the presence of the guard prevents movement of lever 109 to open valve 86 and the blank therefore remains in position on its pedestal, passing onward to the succeeding station. Where, however, leakage of air through the blank is had at station C, plunger 103 is shifted and moves the guard to uncover recess 106, thereby permitting the mechanism at station D to become active and discharge the blank at this station in a manner heretofore indicated. Hence, station C forms a selection station by means of which the blanks can be properly assorted, station C testing the blank for imperfections and determining the activity or inactivity of the mechanism at station D, station D having its activity dependent upon the operations provided at station C. Consequently, station C not only becomes a testing station but, in addition, practically forms the assorting station in that the operations at this station determine the question of whether or not the blank will be discharged at the succeeding station or will pass such latter station to be discharged or removed at a later point.

After leaving station D, the pedestal passes to a station where the imperforate blanks are removed, this being indicated in Fig. 3 as station E. The discharging mechanism at this station is of mechanical type, being rendered active during each cross-head cycle—each time a pedestal is positioned at this station. Where the blank has been removed at station D, the operation of the mechanism at station E provides no result, since the blank had previously been removed. Hence, the mechanism at this station, while passing through its cycle of operations is inactive on a tested blank. Where, however, selection at station C causes the blank to pass by station D, the discharging mechanism at station E grips the blank, raises it from its seat, and discharges it laterally into a suitable receptacle. This mechanism at station E is shown more particularly in detail in Figs. 23 to 25, and is now described.

Mounted on bracket 66 is a member 118 on which the discharging or ejecting mechanism at station E is supported. Member 118 is a composite member having a vertical length greater than the similar length of bracket 66 at the point where member 118 is mounted, plate 118$^a$ having laterally projecting plates 118$^b$ at its upper and lower edges, the upper plate or extension 118$^b$ projecting over the top face of bracket 66 (Fig. 3). Obviously plates 118$^a$ and 118$^b$ may be formed as an integral structure.

Member 118 is yieldingly supported on bracket 66, the latter having a recess 66$^c$ to receive a spring 119, one end of which is seated at the bottom of recess 66$^c$, the other end being in contact with lower plate or extension 118$^b$ (Figs. 23 to 25). 1200 designates a pair of pins which extend vertically through the plates or extensions 118$^b$, these pins either spanning bracket 66 or extending through openings formed in the bracket as may be found most desirable.

This arrangement provides for normally holding member 118 in position with the upper extension 118$^b$ in contact with the top of the bracket (Fig. 25), this position being maintained during the vertical travel of bracket 66 with the cross-head excepting when resistance is encountered during the downward travel of the bracket, whereupon member 118 will yield upwardly, the member resuming its normal position when freed from this resistance.

Member 118 is provided with a laterally extending stud 120 on which is mounted a swinging member 121, this member having its lower end arranged to provide for more or less resiliency, the drawings showing this end as being in the form of a plurality of fingers 121$^a$. These fingers have an external configuration adapted to combinedly produce a rib formation 121$^b$ at a point spaced from the lower end of the fingers, and a rib formation 121$^c$ at such lower end. Rib formation 121$^c$ acts to contact the inner face of the depressed portion of the blank (Fig. 23) and thus grip the blank for removal from its seat, this action taking place as the cross-head is approaching its lower extreme of movement, member 121 at this time, extending vertically as in Fig. 23, the resiliency of the fingers permitting this rib formation to readily enter the depression of the blank and spread out after such entrance. Through the yielding action of member 118, this positioning action of the fingers is had without liability of damaging either the mechanism or the blank.

As shown in Fig. 23, member 121 normally extends vertically, the weight of the member tending to produce this result, in addition to which a spring 122 tends to maintain this position, a shoulder 118$^c$ on member 118 forming a stop to prevent movement of member 121 under the action of spring 112, beyond the vertical. Hence, bracket 66 will carry member 121 in this position during the bracket movements, the downward movement engaging the blank, the succeeding upward movement raising the blank from its seat.

To discharge the raised blank, member 121 is swung on its pivot and, during the outward swinging movement of the arm, the fingers are contracted so as to release the engagement between rib formation 121$^c$ and the blank, the result being that the blank is practically thrown or cast from member 121.

The swinging action of member 121 is provided by contact of a face 121$^d$ of member 121 with a stop 123 during the upward travel of the bracket, stop 123 being carried by a stationary part of the machine, as for instance brace 124, the stop depending from such brace and preferably carrying a roller 123$^a$ at its lower end. Stop 123 is so located with respect to stud 120 that when contact is had between face 121$^d$ and roller 123$^a$, upward travel of bracket 66 causes a cam-like action effective on member 121 to swing the member so as to cause its lower end to move outwardly, spring 122 forming a tension member which serves to prevent violent swinging of the member under this action, thus producing a member movement which is of considerable rapidity but which is more or less uniform due to the fact that substantially throughout the swinging movement contact is had between face 121$^d$ and roller 123$^a$, spring 122 tending to maintain this condition.

To cause the finger actuation for release of the blank, I employ a sleeve 125 shiftable in the direction of length of member 121, this sleeve having its lower end provided with a configuration which coöperates with rib formation 121^b to contract the fingers sufficiently to permit the blank to escape (Fig. 24). The shifting movements of sleeve 125 are in the direction of length of member 121 and are provided by a link 126 having one end connected to sleeve 125 and its opposite end mounted on a stud 127 carried by member 118. Since studs 120 and 127 are out of axial alinement, it will be readily understood that the swinging movements of member 121 will automatically cause sleeve 125 to be shifted in the direction of length of member 121, and the arrangement is such that finger contraction takes place as member 121 approaches or reaches its upper extreme of swinging movement.

Obviously, the uniformity of movement of member 121, and the positive relation of the sleeve movements relative to the swinging movements of member 121, practically insures that successive blanks will be discharged at approximately the same point of swinging movement of member 121, the arrangement being such that this time of discharge is controlled, thereby permitting member 121 to have swung a considerable distance before release is had with the result that the blank, when released, will have acquired a momentum which will carry it outwardly, thereby giving the effect of a throwing or casting action.

Member 121 of course returns to its normal position as soon as the downward travel of bracket 66 has been resumed and such travel has reached a distance sufficient to carry face 121^d out of contact with roller 123, thus placing the discharging or ejecting mechanism in condition to engage a blank if presented by the succeeding pedestal.

As will be understood from the above description, each cycle of operation of the cross-head presents and positions a blank and tests a blank. In addition, action is provided which either discharges a blank or produces an equivalent operation during this cycle, it being understood, of course, that the operation of the machine may provide a condition where no blanks are discharged during one cycle. For instance where a perfect blank follows an imperfect blank, location of the pedestal of the perfect blank prevents action at station D and the previous removal of the blank from the pedestal at station E prevents action at this station. In such case, however, compensation is had by previously or subsequently delivering blanks from both stations D and E during the same cycle. Hence, it may be considered that introducing, testing and discharging actions are taking place concurrently, each active station providing this particular function on a blank so that with the introduction of each blank, a tested and assorted bank will be discharged from the machine.

As will be seen, the entire testing operation is one in which there is no requirement of the use of differential air pressure. The air supply is opened to the testing chamber for a predetermined period and the blank is subjected to this pressure. If no leakage occurs, the blank will travel—freely supported—to station E and be removed from its pedestal, this action being provided by an element or implement which is operative in unison with the machine cycle. The variation from this cycle is provided when leakage takes place. Variation in pressure in cavity 65^a due to leakage is entirely immaterial, performing no function in the operation of the machine, the effective action being provided by the air which has leaked through the blank, this air operating to manipulate a selecting member, and such manipulation is effective to provide activity at station D. This member which is manipulated—guard 105—is of simple character and the mechanism by means of which this guard is moved is of such character that the leakage of a small amount of air through the blank during the time in which the blank is held clamped, is sufficient to provide the necessary activity and length of movement of plunger 103.

This general arrangement, in which the imperfect blank station is first encountered by the tested blank, permits the control of the irregularly-operated discharge mechanism to be provided by the air which has demonstrated the imperfect condition of the blank at the testing station.

Furthermore, it will be seen that the entire testing operation is completed at a single station and while the blank remains stationary and is efficiently clamped in position. This not only enables the use of high pressure for testing purposes—a pressure sufficient to provide the discharge operations at another station—but also practically concentrates the pressure application at a single point for testing and possibly another point for discharge purposes, the pressure application being of short duration. Hence, I am able to meet the operating conditions with a comparatively small expenditure of compressed air and at the same time am able to provide for comparatively rapid operation of the apparatus to produce a large capacity without requiring the use of a large number of pedestal structures, thus not only decreasing the size of apparatus required, but also materially decreasing the cost in view of the fact that the number of pedestals and the air ducts leading thereto is reduced to a comparatively small number.

This ability to complete the testing operation at a single station additionally permits testing of blanks which have configurations containing no inherent cavities by means of which air—either under high or vacuum pressures—can be trapped in order to permit of an extended test. An example of such blank is indicated in the drawings in the form of the screw cap, a structure difficult to be tested by the testing apparatus heretofore employed.

In addition, the ability to employ comparatively high air pressure for testing purposes enables its use for discharging purposes, a fact which simplifies the general arrangement of parts, since it permits of the use of a valve structure common in both operations, a structure which is duplicated for each pedestal and is of simple form, while the operating and control mechanisms are made individual for the two stations at which this air pressure may be employed, thus decreasing the number of parts, and enabling the control to be arranged in a simpler manner and providing for a compact form of structure.

This arrangement also provides practically a closure for cavity 65$^a$ whether a blank be present or not, element 95 closing this cavity in the absence of a blank, so that the amount of air admitted would be limited. Under these conditions, guard 105 would be shifted and open the valve at station D, but in either case, the amount of air discharged is comparatively small and takes place only at these stations and for predetermined periods.

While the embodiment of blank employed in illustrating my invention is of a specific type and one which, due to its general configuration, is subject to more or less difficulty in providing the proper test and especially where it is desirable to provide the test operations with rapidity in order to produce a large capacity for the apparatus, it will be understood that the invention is not limited to use in connection with this particular type of blank, minor changes in structural formation of the apparatus obviously permitting testing of blanks of other configurations. For instance, the general principles of the invention may be employed in connection with the testing of blanks having cavities or having the form of receptacles, such for instance as can bodies which can be readily and rapidly tested under the general principles of the invention by reason of the possibility that the fluid pressure at the testing station can be applied exteriorly of the blank—indicated in the drawings by the seating of the blank in such way as to present the exterior of the depressed portion of the blank to the pressure in cavity 65$^a$. The invention is therefore not to be considered as limited in any respect by the use of the term "blank," since the structure of the latter may be substantially complete prior to testing; whether the blank is to be secured to some other structure, or is practically complete and ready for the particular service which the blank is to perform, does not affect the interpretation to be placed upon the intended meaning of this term in the present specification and claims.

While I have herein shown and described a preferred arrangement and construction of parts, it will be readily understood that variations, changes and modifications therein may be required or found desirable to meet the exigencies of use, and I desire to be understood as reserving the right to make any and all such changes and modifications therein as may be found necessary or desirable, in so far as the same may fall within the spirit and scope of the invention as expressed in the accompanying claims when broadly construed.

Having thus described my invention, what I claim as new, is:

1. In apparatus for testing the leakage qualities of blanks and adapted for large capacity operations, a carrier rotatable about a vertical axis and having a plurality of seats for freely supporting individual blanks, means for rotating the carrier step by step to locate said seats successively at blank-presenting, blank-testing and blank-discharging stations, work-performing instrumentalities at said several stations, and means for operatively connecting said instrumentalities to permit blank presenting, blank testing and blank discharging action on different blanks concurrently at the respective stations.

2. In apparatus for testing the leakage qualities of blanks and adapted for large capacity operations, a carrier rotatable about a vertical axis and having a plurality of seats for freely supporting individual blanks, means for rotating the carrier step by step to locate said seats successively at blank-presenting, blank-testing and blank-discharging stations, work-performing instrumentalities at said several stations, and means for operatively connecting said instrumentalities to permit blank presenting, blank testing and blank discharging action on different blanks concurrently at the respective stations and during periods of dwell of the carrier.

3. In apparatus for testing the leakage qualities of blanks and adapted for large capacity operations, a rotatable carrier having a plurality of seats for freely supporting individual blanks, means for rotating the carrier step by step to locate said seats in predetermined succession at a blank-presenting station, a blank-testing station, and individual blank-discharging stations for leaky and test-proof blanks, work-performing instrumentalities at said several stations, and means for operatively connecting said instrumentalities to cause blank presenting and blank testing action on different blanks concurrently during periods of dwell of the carrier and discharge of a tested blank at the proper discharge station when presented at such discharge station.

4. In apparatus for testing the leakage qualities of blanks and adapted for large capacity operations, a rotatable carrier having a plurality of seats for freely supporting individual blanks, means for rotating the carrier step by step to locate said seats in predetermined succession at a blank-presenting station, a blank-testing station, and individual blank-discharging stations for leaky and test-proof blanks, work-performing instrumentalities at said several stations, and means for operatively connecting said instrumentalities to cause blank presenting and blank testing action on different blanks concurrently during periods of dwell of the carrier and discharge of a tested blank at the proper discharge station when presented at such discharge station, said discharge instrumentalities being operative to remove tested blanks from their seats during such carrier dwell.

5. In apparatus for testing the leakage qualities of blanks and adapted for large capacity operations, a rotatable carrier having a plurality of seats for freely supporting individual blanks, means for rotating the carrier step by step to locate said seats in predetermined succession at a blank-presenting station, a blank-testing station, and individual blank-discharging stations for leaky and test-proof blanks, work-performing instrumentalities at said several stations, means for operatively connecting said instrumentalities to cause blank presenting and blank testing action on different blanks concurrently during periods of dwell of the carrier and discharge of a tested blank at the proper discharge station when presented at such discharge station, said discharge instrumentalities being operative to remove tested blanks from their seats during such carrier dwell, and means responsive to the testing operation for determining the station at which the tested blank will be discharged.

6. In apparatus for testing the leakage qualities of blanks, a rotatable blank carrier movable relatively to and adapted to present a blank at and move it from a testing station, means for completely testing the blank for leaks in the blank material while at such station, and means for retaining the blank against movement during the testing operation.

7. In apparatus for testing the leakage qualities of blanks, a blank carrier rotatable on a vertical axis and movable relatively to and adapted to present a blank at and move it from a testing station, means for completely testing the blank for leaks in the blank material while at such station, and means for retaining the blank against movement during the testing operation.

8. In apparatus for testing the leakage qualities of blanks, a blank carrier rotatable on a vertical axis and movable relatively to and adapted to present a blank at and move it from a testing station, said carrier having a seat on which the blank is supported, and means for clamping the blank to its seat and for completely testing the blank while the seat is held stationary at such station.

9. In apparatus for testing the leakage qualities of blanks, a blank carrier rotatable on a vertical axis and movable relatively to and adapted to present a blank at and move it from a testing station, said carrier having a resilient seat for supporting the blank while on the carrier, and means for clamping the blank on its seat and for completely testing the blank while at such station, said blank being free from clamping action while traveling to and from said station.

10. In apparatus for testing the leakage qualities of blanks, a rotatable carrier having a blank support movable relatively to and adapted to present a blank at and move it from a testing station, said support having a seat for freely supporting the blank, and means for clamping the blank to its seat and for completely testing the blank while at such station.

11. In apparatus for testing the leakage qualities of blanks, a carrier rotatable on a vertical axis and having a blank support adapted to present a blank at and move it from a testing station, said support having a seat for freely supporting the blank, and means for clamping the blank to its seat at such station and for testing the blank while clamped.

12. In apparatus for testing the leakage qualities of blanks, a carrier rotatable on a vertical axis and having a blank support adapted to present a blank at and move it from a testing station, said support having a seat for freely supporting the blank, said support having a cavity open to a seated blank, a source of pressure supply, and means for clamping the blank to its seat at such station and for connecting the cavity and said source while clamped.

13. In apparatus for testing the leakage qualities of blanks, a carrier rotatable on a vertical axis and having a blank support adapted to present a blank at and move it from a testing station, said support having a seat for freely supporting the blank, said support having a cavity open to a seated blank, a source of pressure supply, and means for clamping the blank to its seat at such station and for connecting the cavity and said source for a predetermined period to complete the test while at such station.

14. In apparatus for testing the leakage qualities of blanks, a carrier rotatable on a vertical axis and having a blank support adapted to present a blank at and move it from a testing station, said support having a seat for freely supporting the blank, said support having a cavity open to a seated blank, a source of pressure supply, and means for clamping the blank to its seat at such station and for automatically opening and closing communication between the cavity and support to complete the test while the blank is located at such station.

15. In apparatus for testing the leakage qualities of blanks, a carrier rotatable on a vertical axis and having a blank support adapted to present a blank at and move it from a testing station, said support having a seat for freely supporting the blank, said support having a cavity open to a seated blank, a source of pressure supply, and means for clamping the blank to its seat at such station and for automatically opening and closing communication between the cavity and support to complete the test while the blank is located at such station, said blank being free from clamping action while traveling to and from said station.

16. In apparatus for testing the leakage qualities of blanks, a carrier rotatable on a vertical axis and having a blank support movable relatively to and adapted to present a blank at and move it from a testing station, said support having a seat to freely support a blank, said support also having a cavity open to a seated blank, a source of pressure supply, permanent connections between said supply and the cavity, said connections being normally closed, and means for clamping the blank to its seat and for opening said connections for a predetermined period while the blank is at such station.

17. In apparatus for testing the leakage qualities of blanks, a carrier rotatable on a vertical axis and having a blank support movable relatively to and adapted to present a blank at and move it from a testing station, said support having a seat to freely support a blank, said support also having a cavity open to a seated blank, a source of pressure supply, permanent connections between said supply and the cavity, said connections being normally closed, and means for clamping the blank to its seat and for opening said connections for a predetermined period while the blank is at such station, said means being operative to begin clamping action in advance of opening of the connections and to release the blank from its clamped condition after said connections have been closed.

18. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating carrier frame having a member movable to open and close said valve while the blank is clamped.

19. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating carrier frame having a member movable to open and close said valve while the blank is clamped, said member and valve element being relatively located to cause valve movements by the opposite movements of the member provided by the reversal of frame movements at one limit of its reciprocations.

20. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities.

21. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said blank clamping instrumentality having its activity in advance of and maintained beyond the period of activity of the valve actuating instrumentality.

22. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said blank clamping instrumentality being yieldable.

23. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permenent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said blank-clamping instrumentality having a resilient blank clamping face.

24. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said blank clamping instrumentality including a clamping element supported by said frame, and yieldable means for normally causing said element to partake of the frame movements.

25. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said valve operating instrumentality including a member yieldable in the direction of frame reciprocation.

26. In apparatus for testing the leakage qualities of blanks, a carrier rotatable on a vertical axis and having a blank support movable relatively to and adapted to present a blank at and move it from a testing station, said support having a seat to freely support a blank, said support having a cavity, a source of pressure supply, permanent connections between said source and the cavity, said connections having a normally closed valve, and means for clamping the blank to its seat and for admitting the pressure to said cavity while at such station, said means including a reciprocating frame carrying blank-clamping and valve-moving instrumentalities, said instrumentalities including elements yieldable in the direction of frame reciprocation.

27. In apparatus for testing the leakage qualities of blanks and adapted for high capacity operation, a rotatable blank carrier having a plurality of blank supports movable successively relatively to and adapted to present blanks at and move them from a testing station, means for completely testing the blank for leaks in the blank material while at such station, and means for retaining the blank against movement during the testing operation.

28. In apparatus for testing the leakage qualities of blanks and adapted for high capacity operation, a rotatable blank carrier having a plurality of blank supports movable successively relatively to and adapted to present blanks at and move them from a testing station, each support having a seat on which the blank is freely supported while out of such station, means for completely testing the blank for leaks in the blank material while at such station, and means for retaining the blank fixedly positioned on its seat during the testing operation.

29. In apparatus for testing the leakage qualities of blanks and adapted for high capacity operation, a rotatable blank carrier having a plurality of blank supports movable successively relatively to and adapted to present blanks at and move them from a testing station, means for moving the carrier intermittently to position each support at such station and provide a dwell of the support thereat, means operative during such dwell for completely testing the blank at such station, and means for retaining the blank against movement during the testing operation.

30. In apparatus for testing the leakage qualities of blanks and adapted for high capacity operation, a rotatable blank carrier having a plurality of blank supports movable successively relatively to and adapted to present blanks at and move them from a testing station, each support having a testing cavity, a source of pressure supply, connections between said source and the individual cavities, said connections being normally closed, and means for clamping each blank to its seat while in said testing station and for admitting the testing pressure to the cavity of the clamped blank while at such station.

31. In apparatus for testing the leakage qualities of blanks and adapted for high capacity operation, a rotatable blank carrier having a plurality of blank supports movable successively relatively to and adapted to present blanks at and move them from a testing station, each support having a testing cavity, a source of pressure supply, connections between said source and the individual cavities, said connections being normally closed, and means for clamping each blank to its seat while in said testing station and for admitting the testing pressure to the cavity of the clamped blank while at such station, said latter means including a reciprocating frame carrying a blank-clamping instrumentality operative solely at such station.

32. In apparatus for testing the leakage qualities of blanks and adapted for high capacity operation, a rotatable blank carrier having a plurality of blank supports movable successively relatively to and adapted to present blanks at and move them from a testing station, each support having a testing cavity, a source of pressure supply, connections between said source and the individual cavities, said connections being normally closed, and means for clamping each blank to its seat while in said testing station and for admitting the testing pressure to the cavity of the clamped blank while at such station, said latter means including a reciprocating frame carrying blank-clamping and pressure-admittance control instrumentalities operative solely at such station.

33. In apparatus for testing the leakage qualities of blanks, a rotatable carrier having a blank support adapted to present a blank at and move it from a testing station, said support having a seat for freely supporting the blank, said support having a testing cavity open to the seated blank, means for controllably admitting testing pressure to said cavity, in said station, and means for clamping the blank to its seat while at such station, said latter means including a reciprocating frame carrying a blank-clamping instrumentality operative solely at such station.

34. In apparatus for testing the leakage qualities of blanks, a carrier rotatable on a vertical axis and having a blank support movable relatively to and adapted to present a blank at and move it from a testing station, said support having a seat to freely support a blank, said support also having a testing cavity, a source of pressure supply adapted to be operatively connected to said cavity in the testing station, means operative at the testing station for clamping the blank to its seat while subject to the testing pressure, and means for bleeding the cavity upon completion of the testing operation.

35. In apparatus for testing the leakage qualities of blanks, a carrier rotatable on a vertical axis and having a blank support movable relatively to and adapted to present a blank at and move it from a testing station, said support having a seat to freely support a blank, said support also having a testing cavity, a source of pressure supply adapted to be operatively connected to said cavity in the testing station, means for clamping the blank to its seat while subject to the testing pressure at the testing station, and means for bleeding the cavity while the blank is in said station and upon completion of the testing operation.

36. In apparatus for testing the leakage qualities of blanks, a carrier rotatable on a vertical axis and having a blank support movable relatively to and adapted to present a blank at and move it from a testing station, said support having a seat to freely support a blank, said support also having a testing cavity, a source of pressure supply adapted to be operatively connected to said cavity in the testing station, means for clamping the blank to its seat during a predetermined period and while subject to the testing pressure at such station, and means rendered active upon completion of the clamping period for maintaining the blank on its support while permitting pressure release from the cavity.

37. In apparatus for testing the leakage qualities of blanks, a carrier rotatable on a vertical axis and having a blank support movable relatively to and adapted to present a blank at and move it from a testing station, said support having a seat to freely support a blank, said support also having a testing cavity, a source of pressure supply adapted to be operatively connected to said cavity in the testing station, means for clamping the blank to its seat during a predetermined period and while subject to the testing pressure at such station, and an element yieldable under clamping action and rendered active upon completion of the clamping action and upon completion of the clamping period for maintaining the blank on its support while permitting pressure release from the cavity.

38. In apparatus for testing the leakage qualities of blanks, a carrier rotatable on a vertical axis and having a blank support movable relatively to and adapted to present a blank at and move it from a testing station, said support having a seat to freely support a blank, said support having a testing cavity, a source of pressure supply adapted to be operatively connected to said cavity in the testing station, means for clamping the blank to its seat during a predetermined period and while subject to the testing pressure at such station, and an element carried by and movable with the clamping means for maintaining the blank on its support while permitting pressure release from the cavity.

39. In apparatus for testing the leakage qualities of blanks, a carrier rotatable on a vertical axis and having a blank support movable relatively to and adapted to present a blank at and move it from a testing station, said support having a seat to freely support a blank, said support also having a testing cavity, a source of pressure supply adapted to be operatively connected to said cavity in the testing station, means for clamping the blank to its seat during a predetermined period and while subject to the testing pressure at such station, and an element carried by and movable with the clamping means for maintaining the blank on its support while permitting pressure release from the cavity, said element being yieldable and adapted to contact the blank in advance of blank-clamping action.

40. In apparatus for testing the leakage qualities of blanks having a depressed or a cavity-forming configuration, a blank testing station, a blank carrier movable relative to and adapted to present a blank at such station, said carrier having a seat for the blank, and means operative on the blank at such station for subjecting the blank to fluid pressure with the pressure applied exteriorly to the blank configuration.

41. In apparatus for testing the leakage qualities of blanks having a depressed or a cavity-forming configuration, a blank testing station, a blank carrier movable relative to and adapted to present a blank at such station, said carrier having a seat for the blank, a cavity into which the seated blank extends, and means for supplying fluid pressure to said cavity while the blank is in the testing station to provide pressure application to the exterior walls of the blank located in said cavity.

42. In apparatus for testing the leakage qualities of blanks, a blank carrier rotatable about a fixed axis and adapted to present a blank successively to a testing station and then to a discharging station adjacent the path of rotation of said carrier with the blank freely supported on the carrier, means for testing the blank for leakage while at the testing station, and means responsive to the testing operation at the testing station for determining the discharge of the blank at the discharge station.

43. In apparatus for testing the leakage qualities of blanks, a blank carrier rotatable about a fixed axis and adapted to present a blank successively to a testing station and then to a discharging station adjacent the path of rotation of said carrier with the blank freely supported on the carrier, means for testing the blank for leakage while at the testing station, and a selecting instrumentality responsive to the testing operation at the testing station for determining the discharge of the blank at the discharge station.

44. In apparatus for testing the leakage qualities of blanks, a blank carrier rotatable about a fixed axis and adapted to present a blank successively to a testing station and then to a discharging station adjacent the path of rotation of said carrier with the blank freely supported on the carrier, means for testing the blank for leakage while at the testing station, and a selecting instrumentality responsive to the testing operation at the testing station for determining the activity or inactivity of the discharge mechanism on the tested blank.

45. In apparatus for testing the leakage qualities of blanks, a rotatable blank carrier movable relatively to testing and discharging stations and adapted to present a blank to and move it from the testing station to the discharging station with the blank freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank.

46. In apparatus for testing the leakage qualities of blanks, a rotatable blank carrier movable relatively to testing and discharging stations and adapted to present a blank to and move it from the testing station to the discharging station with the blanks freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including an element movable between two selected positions, said element being normally in one position and shiftable to its other position in the presence of a leaky blank.

47. In apparatus for testing the leakage qualities of blanks, a rotatable blank carrier movable relatively to testing and discharging stations and adapted to present a blank to and move it from the testing station to the discharging station with the blanks freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including a shiftable element operative to determine the activity and inactivity of the discharging mechanism on the tested blank.

48. In apparatus for testing the leakage qualities of blanks, a rotatable blank carrier movable relatively to testing and discharging stations and adapted to present a blank to and move it from the testing station to the discharging station with the blanks freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including an element normally in one position and shiftable in the presence of a leaky blank to a second position, and means rendered active by the test leakage for shifting said element from its normal position.

49. In apparatus for testing the leakage qualities of blanks, a rotatable blank carrier movable relatively to testing and discharging stations and adapted to present a blank to and move it from the testing station to the discharging station with the blank freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including an element normally in one position and shiftable in the presence of a leaky blank to a second position, and means rendered active by the test leakage for shifting said element from its normal position, said latter means including a plunger rendered active solely by said test leakage.

50. In apparatus for testing the leakage qualities of blanks and in which freely supported blanks are successively moved into a testing station, clamped and tested at such station, and the tested blank then moved to a discharge station, a rotatable carrier for the blanks movable to present the blanks at such stations successively, testing mechanism operative at the testing station to determine the presence of leaks, discharge mechanism at the discharge station, and selector mechanism responsive to the testing operations for determining the activity or inactivity of the discharge mechanism, said selector mechanism including selective control means made operative as to selection at the testing station with the selected control made active at the discharge station.

51. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumentality responsive to the testing operations at the testing station for determining the discharge of the blank at the discharge station, said selector instrumentality including a shiftable element carried by and movable with the clamping instrumentality, said element being shiftable in the presence of a leaky blank.

52. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumentality responsive to the testing operations at the testing station for determining the discharge of the blank at the discharge station, said selector instrumentality including a shiftable element carried by and movable with the clamping instrumentality, said element being shiftable from a normal position by the test leakage produced during the testing operation.

53. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumentality responsive to the testing operations at the testing station for determining the discharge of the blank at the discharge station, said selector instrumentality including a shiftable element carried by and movable with the clamping instrumentality, said element being shiftable from a normal position by the test leakage produced during the testing operation, and tension means for returning the element to its normal position.

54. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumentality responsive to the testing operations at the testing station for determining the discharge of the blank at the discharge station, said clamping instrumentality including a member having a conduit for test leakage, and a shiftable element carried by said member and operative in the selector instrumentality in the presence of such test leakage.

55. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumentality responsive to the testing operations at the testing station for determining the discharge of the blank at the discharge station, said clamping instrumentality including a member having a conduit for test leakage, and a shiftable element carried by said member and operative in the selector instrumentality in the presence of such test leakage, said conduit and shiftable element being inactive in the presence of a test-proof blank at the testing station.

56. In apparatus for testing the leakage qualities of blanks and in which the blank is tested at a testing station preliminary to discharge at a discharging station, a rotatable blank carrier movable relatively to the testing and discharging stations and adapted to present a blank to the testing station and after testing move it from the testing station to the discharge station with the blank freely supported on the carrier, a blank-clamping instrumentality operative at the testing station, means for subjecting the clamped blank to testing pressure in such station, and a selector instrumetality responsive to the testing operations at the testing station for determining the discharge of the blank at the discharge station, said selector instrumentality including a member carrying a recess, a guard member normally covering said recess, and means operative in the presence of test leakage for shifting said guard member from its normal position to uncover said recess.

57. In apparatus for testing the leakage qualities of blanks and in which successive blanks are moved relative to testing and discharge stations, a rotatable carrier movable relatively to said stations and having a plurality of supports for individual blanks with each blank mounted freely on its support, said carrier being adapted to locate supports successively in the testing station, means for subjecting the clamped blank to testing pressure, and selector mechanism operative at the testing station for determining the discharge of the tested blank, said selector mechanism including a shiftable member for each blank support, said member being normally in one position when the support is moved to the testing station, and means at the testing station for shifting said member in the presence of a leaky blank at such station.

58. In apparatus for testing the leakage qualities of blanks and in which successive blanks are moved relative to testing and discharge stations, a rotatable carrier movable relatively to said stations and having a plurality of supports for individual blanks with each blank mounted freely on its support, said carrier being adapted to locate supports successively in the testing station, a blank-clamping instrumentality operative in the testing station, means for subjecting the clamped blank to testing pressure, and selector mechanism operative at the testing station for determining the discharge of the tested blank, said selector mechanism including a shiftable member for each blank support, said member being normally in one position when the support is moved to the testing station, and means at the testing station for shifting said member in the presence of a leaky blank at such station, said latter means including a shiftable element movable from a normal position of inactivity in the presence of test leakage at the testing station.

59. In apparatus for testing the leakage qualities of blanks, a rotatable blank carrier movable relatively to testing and discharging stations and adapted to present a blank to and move it from the testing station to the discharging station with the blanks freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including an element normally active to render the discharge mechanism inactive and shiftable in the presence of a leaky blank to render said mechanism active on the tested blank.

60. In apparatus for testing the leakage qualities of blanks and in which freely supported blanks are successively moved into a testing station, clamped and tested at such station, and the tested blank then moved to a discharge station, a rotatable carrier for the blanks movable to present the freely-supported blanks at said stations successively, testing mechanism operative at the testing station to determine the presence of leaks, discharge mechanism at the discharge station, and means rendered active in the presence of a leaky blank at the testing station for rendering the discharge mechanism active at the discharge station.

61. In apparatus for testing the leakage qualities of blanks and in which freely-supported blanks are successively moved into a testing station, clamped and tested at such station, and the tested blank then moved to a discharge station, a rotatable carrier for the blanks movable to present the freely-supported blanks at said stations successively, testing mechanism operative at the testing station to determine the presence of leaks, discharge mechanism at the discharge station, said discharge mechanism including means for discharging a leaky blank from the carrier by fluid pressure while in such discharge station, and means rendered active by the testing operations for controlling the operation of said discharge means.

62. In apparatus for testing the leakage qualities of blanks and in which freely supported blanks are successively moved into a testing station, clamped and tested at such station, and the tested blank then moved to a discharge station, a rotatable carrier for the blanks movable to present the freely supported blanks at said stations successively, testing mechanism operative at the testing station to determine the presence of leaks, discharge mechanism at the discharge station, said discharge mechanism including a fluid pressure supply, means at the discharge station for subjecting the tested blank to the action of the fluid pressure to discharge the blank, and means rendered active by the testing operations for controlling the operation of said discharge means.

63. In apparatus for testing the leakage qualities of blanks and in which freely-supported blanks are successively moved into a testing station, clamped and tested at such station, and the tested blank then moved to a discharge station, a rotatable carrier for the blanks movable to present the freely-supported blanks at said stations successively, testing mechanism operative at the testing station to determine the presence of leaks, discharge mechanism at the discharge station, said carrier having a seat for freely supporting the tested blank, said discharge mechanism including a fluid pressure supply, valve connections between the supply and the seat, whereby valve manipulation will cause the admitted pressure to forcibly discharge the leaky blank from its seat, and means rendered active at the testing station for controlling the valve movements.

64. In apparatus for testing the leakage qualities of blanks and in which successive blanks are moved relative to testing and discharge stations, a rotatable carrier movable relatively to said stations and having a seat on which the blank is adapted to be freely supported, means for testing the blank while on its seat at the testing station, discharge mechanism at the discharge station for forcibly moving the blank from its seat, and means rendered active at the testing station for controlling the activity and inactivity of said discharge mechanism.

65. In apparatus for testing the leakage qualities of blanks and in which successive blanks are moved relative to testing and discharge stations, a rotatable carrier movable relatively to said stations and having a seat on which the blank is adapted to be freely supported, means for testing the blank while on its seat at the testing station, discharge mechanism at the discharge station for forcibly moving the blank from its seat, said discharge mechanism including means for discharging the leaky blank from the carrier by fluid pressure while in such discharge station, and means rendered active at the testing station for determining the activity and inactivity of said discharge mechanism.

66. In apparatus for testing the leakage qualities of blanks and in which successive blanks are moved relative to testing and discharge stations, a rotatable carrier movable relatively to said stations and having a seat on which the blank is adapted to be freely supported, means for testing the blank while on its seat at the testing station, discharge mechanism at the discharge station for forcibly moving the blank from its seat, said discharge mechanism including a fluid pressure supply, valve connections between said supply source and the seat, means for manipulating said valve connections to subject the seated blank to the fluid pressure while in such station, and means rendered active at the testing station for determining the activity or inactivity of the valve manipulating means.

67. In apparatus for testing the leakage qualities of blanks and in which successive blanks are moved relative to testing and discharge stations, a rotatable carrier movable relatively to said stations and having a seat on which the blank is adapted to be freely supported, means for testing the blank while on its seat at the testing station, discharge mechanism at the discharge station for forcibly moving the blank from its seat, said discharge mechanism including valve controlled means for subjecting the seated blank to the action of fluid pressure, said means including a lever movable to open and close the valve connections, means for actuating said lever, and means controlled by the testing operation for determining the length of movement of said lever.

68. In apparatus for testing the leakage qualities of blanks, a rotatable carrier for blanks movable relative to blank testing and blank discharging stations, testing mechanism operative at the testing station, blank discharging mechanism operative to discharge a leaky blank at the discharge station, and means at the testing station to determine the activity and inactivity of the blank - discharging mechanism, said discharging mechanism including normally-inactive valve-controlled means for subjecting the blank to fluid pressure action, and means at the discharge station for rendering said valve controlled means active during a predetermined period and in the presence of a leaky blank at said discharge station.

69. In apparatus for testing the leakage qualities of blanks, a rotatable carrier for blanks movable relative to blank testing and blank discharging stations, testing mechanism operative at the testing station, blank discharging mechanism operative to discharge a leaky blank at the discharge station, and means at the testing station to determine the activity and inactivity of the blank-discharging mechanism, said discharging mechanism including normally-inactive valve-controlled means for subjecting the blank to fluid pressure action, and means for rendering said valve-controlled means active at the discharge station, said latter means comprising a normally inactive lever, a rocking arm adapted to move said lever to manipulate the valve, and means for rocking said arm in the presence of a leaky blank.

70. In apparatus for testing the leakage qualities of blanks, a rotatable carrier for blanks movable relative to blank testing and blank discharging stations, testing mechanism operative at the testing station, blank discharging mechanism operative to discharge a leaky blank at the discharge station, and means at the testing station to determine the activity and inactivity of the blank-discharging mechanism, said discharging mechanism including normally-inactive valve-controlled means for subjecting the blank to fluid pressure action, and means for rendering said valve-controlled means active at the discharge station, said latter means comprising a normally inactive lever, a rocking arm adapted to move said lever to manipulate the valve, and means for rocking said arm in the presence of a leaky blank, said arm-rocking means including a cam, an arm operated by said cam, and a member having a yielding relation toward said cam-operated arm.

71. In apparatus for testing the leakage qualities of blanks, a rotatable carrier for blanks movable relative to blank testing and blank discharging stations, testing mechanism operative at the testing station, blank discharging mechanism operative to discharge a leaky blank at the discharge station, and means at the testing station to determine the activity and inactivity of the blank-discharging mechanism, said discharging mechanism including normally-inactive valve-controlled means carried by and movable with said carrier for subjecting the blank to fluid pressure action, and means at the discharge station for manipulating the fluid pressure valve during a predetermined period and in the presence of a leaky blank at the discharging station.

72. In apparatus for testing the leakage qualities of blanks, a rotatable carrier for blanks movable relative to blank testing and blank discharging stations, testing mechanism operative at the testing station, blank discharging mechanism operative to discharge a leaky blank at the discharge station, and means at the testing station to determine the activity and inactivity of the blank discharging mechanism, said discharging mechanism including normally-inactive valve-controlled means for subjecting the blank to fluid pressure action, and means for rendering said valve-controlled means active at the discharge station, said latter means comprising a pivoted lever normally inactive with respect to the fluid pressure valve, a cam, operative connections between the cam and said lever for moving the latter to manipulate the valve, and a selector mechanism for controlling the movements of said lever, said operative connections including yielding means for compensating for connection movements when the selector mechanism is positioned to retain said lever inactive.

73. In apparatus for testing the leakage qualities of blanks, a rotatable carrier for blanks, and means for testing the blank while on the carrier and discharging the blank after testing by successive operations, said means including a source of fluid pressure supply, and mechanism for rendering said supply active on the blank during both operations.

74. In apparatus for testing the leakage qualities of blanks, a rotatable carrier for blanks, and means for testing the blank while on the carrier and discharging the blank after testing by successive operations, said means including a source of fluid pressure supply, and mechanism for rendering said supply active on the blank during the periods when the blank is being tested and discharged.

75. In apparatus for testing the leakage qualities of blanks, a rotatable carrier for blanks movable to present a blank successively into testing and discharging stations, and means for testing the blank at the testing station and for forcibly discharging the tested blank at the discharge station, said means including a source of fluid pressure supply, and mechanism for rendering said supply active at each station.

76. In apparatus for testing the leakage qualities of blanks, a rotatable carrier for blanks movable to present a blank successively into testing and discharging stations, and means for testing the blank at the testing station and for forcibly discharging the tested blank at the discharge station, said means including a source of fluid pressure supply, and mechanism for rendering said supply active at each station, and for maintaining the supply inactive between stations.

77. In apparatus for testing the leakage qualities of blanks, a rotatable carrier for blanks movable to present a blank successively into testing and discharging stations, and means for testing the blank at the testing station and for forcibly discharging the tested blank at the discharge station, said means including a source of fluid pressure supply, normally-inactive valve-controlled connections between said supply and the blank seat to subject the blank to pressure action, and means for manipulating the valve at said stations.

78. In apparatus for testing the leakage qualities of blanks, a rotatable carrier for blanks movable to present a blank successively into testing and discharging stations, and means for testing the blank at the testing station and for forcibly discharging the tested blank at the discharge station, said means including a source of fluid pressure supply, normally-inactive valve-controlled connections between said supply and the blank seat to subject the blank to pressure action, and independent valve manipulating mechanisms at said stations.

79. In apparatus for testing the leakage qualities of blanks, a rotatable carrier for blanks movable to present a freely supported blank successively into testing and discharging stations, means for clamping the blank to its support while in the testing station, and means for subjecting the supported blank to the action of fluid pressure in both stations, whereby the blank will be retained seated in the testing station and be forcibly discharged at the discharging station.

80. In apparatus for testing the leakage qualities of blanks, a rotatable carrier for blanks movable to present a freely supported blank successively into testing and discharging stations, means for clamping the blank to its support while in the testing station, and means for subjecting the supported blank to the action of fluid pressure in both stations, said means including normally-inactive valve-controlled connections between the source of fluid pressure supply and the blank support, and means operative in said stations for manipulating the fluid pressure valve.

81. In apparatus for testing the leakage qualities of blanks, a rotatable carrier for blanks movable to present a freely supported blank successively into testing and discharging stations, means for clamping the blank to its support while in the testing station, and means for subjecting the supported blank to the action of fluid pressure in both stations, said means including normally-inactive valve-controlled connections between the source of fluid pressure supply and the blank support, means operative in said stations for manipulating the fluid pressure valve, and means whereby said clamping mechanism will be rendered inactive prior to the movement of the blank from its testing station.

82. In apparatus for testing the leakage qualities of blanks, a rotatable carrier adapted to present a succession of freely supported blanks into testing and discharging stations arranged successively in the travel of the carrier, means operative in the testing station for clamping each blank to its seat, a fluid pressure supply, connections between the supply and the blank support, and means whereby supply activity will be had on each blank at the testing station and on leaky tested blanks at the discharge station.

83. In apparatus for testing the leakage qualities of blanks, a rotatable carrier adapted to present a succession of freely supported blanks into testing and discharging stations arranged successively in the travel of the carrier, means operative in the testing station for clamping each blank to its seat, a fluid pressure supply, connections between the supply and the blank support, and means whereby supply activity will be had on each blank at the testing station and on leaky tested blanks at the discharge station, said latter means including a selector instrumentality controlled at the testing station for determining the activity and inactivity of the supply at the discharge station.

84. In apparatus for testing the leakage qualities of blanks, a rotatable carrier having a plurality of blank-supporting seats and movable to present a succession of freely supported blanks into testing and discharging stations arranged successively in the travel of the carrier, means operative in the testing station for clamping each blank to its seat, a fluid pressure supply controllably connected to each seat, said supply being normally inactive with respect to the seated blank, and means whereby supply activity on each blank will be had at the testing station and on leaky tested blanks at the discharge station.

85. In apparatus for testing the leakage qualities of blanks, a rotatable carrier having a plurality of blank-supporting seats and movable to present a succession of freely supported blanks into testing and discharging stations arranged successively in the travel of the carrier, means operative in the testing station for clamping each blank to its seat, a fluid pressure supply controllably connected to each seat, said supply being normally inactive with respect to the seated blank, and means whereby supply activity on each blank will be had at the testing station and on leaky tested blanks at the discharge station, said latter means including a selector instrumentality operative at the testing station.

86. In apparatus for testing the leakage qualities of blanks, a rotatable carrier having a plurality of blank-supporting seats and movable to present a succession of freely supported blanks into testing and discharging stations arranged successively in the travel of the carrier, means operative in the testing station for clamping each blank to its seat, a fluid pressure supply controllably connected to each seat, said supply being normally inactive with respect to the seated blank, and means whereby supply activity on each blank will be had at the testing station and on leaky tested blanks at the discharge station, with supply activity at the discharge station concurrent with the similar activity at the testing station.

87. In apparatus for testing the leakage qualities of blanks, a rotatable blank carrier movable relatively to testing and discharging stations and adapted to present a blank to and move it from the testing station to the discharging station with the blanks freely supported on the carrier, means for clamping the blank while at the testing station, means for subjecting the clamped blank to leak testing while at such station, discharging mechanism at the discharging station, and a selector instrumentality responsive to the testing operations at the testing station for determining the activity or inactivity of the discharging mechanism on the tested blank, said instrumentality including an element normally active to render the discharge mechanism active on a tested blank, and means made active by the shifting of said element to retain the discharging mechanism inactive on the tested blank responsible for the element shifting.

88. In apparatus for testing the leakage qualities of blanks and in which freely supported blanks are successively presented in testing and discharging stations, a rotatable carrier for the blanks and movable relative to said stations, means for testing each blank at the testing station, discharging mechanism operative at the discharging station in synchronism with the testing mechanism operation, and means responsive to the testing operations for controlling the activity or inactivity of the discharging mechanism on a tested blank.

89. In apparatus for testing the leakage qualities of blanks and in which freely supported blanks are successively presented in testing and discharging stations, a rotatable carrier having a plurality of blank supports movable successively relative to said stations, means for testing each blank at the testing station, discharging mechanism operative at the discharging station in synchronism with the testing mechanism operation, and means responsive to the testing operations for controlling the activity or inactivity of the discharging means on a tested blank.

90. In apparatus for testing the leakage qualities of blanks and in which freely supported blanks are successively presented in testing and discharging stations, a rotatable carrier having a plurality of blank supports, movable successively relative to said stations, means for testing each blank at the testing station, discharging mechanism operative at the discharging station in synchronism with the testing mechanism operation, and means responsive to the testing operations for controlling the activity or inactivity of the discharging means on a tested blank, said discharging and testing mechanisms being operatively connected to provide discharge mechanism operation concurrently with testing mechanism operation.

91. In apparatus for testing the leakage qualities of blanks and in which freely supported blanks are successively presented in testing and discharging stations, a rotatable carrier having a plurality of blank supports movable successively relative to said stations, means for testing each blank at the testing station, discharging mechanism operative at the discharging station in synchronism with the testing mechanism operation, and means responsive to the testing operations for controlling the activity or inactivity of the discharging means on a tested blank, said control means including a selector instrumentality adapted to determine discharge mechanism activity on a tested blank, instrumentality selection being provided at the testing station.

92. In apparatus for testing the leakage qualities of blanks and in which freely supported blanks are successively presented in testing and discharging stations, a rotatable carrier having a plurality of blank supports movable successively relative to said stations, means for testing each blank at the testing station, discharging mechanism operative at the discharging station in synchronism with the testing mechanism operation, and means responsive to the testing operations for controlling the activity or inactivity of the discharging means on a tested blank, said control means including a selector instrumentality adapted to determine discharge mechanism activity on a tested blank, instrumentality selection being provided at the testing station concurrently with the testing operation.

93. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including an instrumentality adapted to engage the blank and raise the blank to remove it from its support in the discharge station and discharge the blank laterally from the apparatus.

94. In apparatus for testing the leakage qualities of blanks and in which freely supported blanks are successively tested and discharged from the apparatus, a rotatable carrier for presenting a blank maintained in position by gravity at the testing and discharging stations, testing and discharging mechanisms at the respective stations, said discharging mechanism including an instrumentality adapted to engage the blank and remove the blank from its support in the discharge station and discharge the blank from the apparatus by a casting or throwing movement.

95. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a pivoted member movable bodily toward and from a supported tested blank to engage and remove the support blank, and means for swinging said member on its pivot and concurrently releasing the blank grip, whereby a supported blank will be removed from its support and shifted laterally away from the apparatus.

96. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating support, a member pivoted on said support and movable bodily therewith, said member having means for gripping a blank located in the discharging station, the movement of said support in a direction away from the blank support acting to remove the seated blank, and means for swinging said member on its pivot during such support travel and for releasing the blank grip during such swinging movement.

97. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating bracket, a support yieldably mounted thereon, a member pivotally mounted on the support and having an end movable toward and from a blank seated on the carrier at the discharging station, said member being adapted to grip the seated blank, whereby movements of the bracket will remove the blank from its seat, and means for swinging said member on its pivot during bracket movements and for releasing the blank grip during member swinging movements.

98. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating bracket, a support yieldably mounted thereon, a member pivotally mounted on the support and having an end movable toward and from a blank seated on the carrier at the discharging station, said member being adapted to grip the seated blank, whereby movements of the bracket will remove the blank from its seat, means for swinging said member on its pivot during bracket movements, and means made active by the member swinging movements for releasing the blank grip.

99. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating bracket, a support yieldably mounted thereon, a member pivotally mounted on the support and having an end movable toward and from a blank seated on the carrier at the discharging station, said member being adapted to grip the seated blank, whereby movements of the bracket will remove the blank from its seat, a stationary element in the path of travel of the member for swinging said member on its pivot during bracket movements, and means rendered active by such swinging movements for releasing the blank grip.

100. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating bracket, a support yieldably mounted thereon, a member pivotally mounted on the support and having an end movable toward and from a blank seated on the carrier at the discharging station, said member being adapted to grip the seated blank, whereby movements of the bracket will remove the blank from its seat, a stationary element in the path of travel of the member for swinging said member on its pivot during bracket movements, said member having a plurality of blank gripping fingers adapted to normally engage the blank, and means made active by the member swinging movements for moving the gripping fingers to release the blank.

101. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a reciprocating bracket, a support yieldably mounted thereon, a member pivotally mounted on the support and having an end movable toward and from a blank seated on the carrier at the discharging station, said member being adapted to grip the seated blank, whereby movements of the bracket will remove the blank from its seat, a stationary element in the path of travel of the member for swinging said member on its pivot during bracket movements, said member having a plurality of blank gripping fingers adapted to normally engage the blank, a sleeve on said member, and means for reciprocating said sleeve on the member to move the fingers to release the blank, said latter means being made operative by the swinging movements of the member.

102. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a vertically movable support, a member pivoted on said support with a member portion normally extending downwardly from the pivot point and having fingers for engaging a blank supported in said station, means in the path of travel of said member for swinging the member on its pivot, said latter means being made operative during the upward travel of the support, and means for manipulating the fingers to release the blank during the member swinging movements.

103. In apparatus for testing the leakage qualities of blanks and in which freely supported blanks are successively tested and discharged from the apparatus, a rotatable carrier for presenting a freely supported blank at the testing and discharging stations, testing and discharging mechanisms at the respective stations, said discharging mechanism including a vertically movable support, a member pivoted on said support with a member portion normally extending downwardly from the pivot point and having fingers for engaging a blank supported in said station, means in the path of travel of said member for swinging the member on its pivot, said latter means being made operative during the upward travel of the support, a spring for tensioning the member swinging movements, and means for manipulating the fingers to release the blank during the member swinging movements.

104. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, independent discharging mechanisms at the discharge stations, and means for rendering the discharge mechanism of the leaky blank discharge station inactive in the presence of a test-proof blank at said station.

105. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, discharge mechanism at the leaky blank discharge station operative in the presence of a leaky blank at such station, discharge mechanism at the test-proof discharge station operative in synchronism with the testing mechanism, and means for rendering said leaky blank discharge mechanism inactive in the presence of a test-proof blank at such station.

106. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, a fluid pressure supply active during the testing operation, discharging mechanism at the leaky blank station and including means for rendering the fluid pressure active on a blank present in said station to discharge the blank, discharging mechanism at the test-proof blank discharge station, and means for limiting fluid pressure activity at the leaky blank discharge station to periods when a leaky blank is located at such station.

107. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, a fluid pressure supply active during the testing operation, discharging mechanism at the leaky blank station and including means for rendering the fluid pressure active on a blank present in said station to discharge the blank, discharging mechanism at the test-proof discharge blank station, said latter mechanism being operative in synchronism with the testing operation, and means for limiting fluid pressure activity at the leaky blank station to periods when a leaky blank is located at such station.

108. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, independent discharging mechanisms at the discharge stations, and means responsive to the testing operations for rendering said leaky blank discharge mechanism inactive in the presence of a test-proof blank at the leaky blank discharge station.

109. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, independent discharging mechanisms at the discharge stations, and means responsive to the testing operations for rendering said leaky blank discharge mechanism inactive in the presence of a test-proof blank at the leaky blank discharge station, said latter means being made active to determine the activity or inactivity of the leaky blank discharge mechanism during the test of the blank at the testing station.

110. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, independent discharging mechanisms at the discharge stations, and means responsive to the testing operations for rendering said leaky blank discharge mechanism inactive in the presence of a test-proof blank at the leaky blank discharge station, said latter means being made active to determine the activity or inactivity of the leaky blank discharge mechanism during the period when the blank is positioned at the testing station.

111. In apparatus for testing the leakage qualities of blanks, a rotatable carrier adapted to freely support blanks and movable relative to a testing station, a station for discharging leaky blanks, and a station for discharging test-proof blanks, testing mechanism at the testing station, independent discharging mechanisms at the discharge stations, and means responsive to the testing opertaions for rendering said leaky blank discharge mechanism inactive in the presence of a test-proof blank at the leaky blank discharge station, said latter means including a selector instrumentality made active to determine the activity or inactivity of the leaky blank discharge mechanism during the testing of the blank at the testing station.

112. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism being made active to provide the selection while the blank is undergoing test at the testing station.

113. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism including a member individual to each blank support and operative to control the activity and inactivity of the discharge mechanism at one of said discharging stations.

114. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism including a member individual to each blank support and operative by its position to control the activity and inactivity of the discharge mechanism at one of said discharging stations.

115. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism including a member individual to each blank support and operative by its position to control the activity and inactivity of the discharge mechanism at one of said discharging stations, and means at the testing station and responsive to the testing operations for determining the position of said member.

116. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism including a member individual to each blank support, and means operative on said member in advance of its location at the testing station for positioning the member to render the mechanism at the leaky blank station inactive.

117. In apparatus for testing the leakage qualities of blanks, a rotatable carrier having spaced supports for freely supporting blanks and movable to present a succession of blanks to a testing station and to a leaky blank discharge station and to present test-proof blanks to a test-proof blank discharge station, testing mechanism at the testing station, independent discharge mechanisms at the discharging stations, and selection mechanism for determining the discharge station of the tested blank, said selection mechanism including a member individual to each blank support and operative to control the activity and inactivity of the discharge mechanism at one of said discharging stations, said member being shiftable between two positions, means for placing the member in one position in advance of its location at the testing station to normally retain the leaky blank discharge mechanism inactive, and means operative in the presence of a leaky blank to shift said member during the testing operation to render said leaky blank discharge mechanism active.

118. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, and mechanism operative in synchronism with the testing operation for presenting a blank to its seat at the blank-presenting station.

119. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, and mechanism operative in synchronism with the testing operation for presenting a blank to its seat at the blank-presenting station, said latter mechanism including a blank runway, and a presenting instrumentality operative to move the blank from said runway and locate it on its seat.

120. In apparatus for testing the leakage qualities of blanks and in which positions blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, and mechanism operative in synchronism with the testing operation for presenting a blank to its seat at the blank-presenting station, said latter mechanism including a blank runway, and a presenting instrumentality operative to move the blank from said runway and locate it on its seat, said instrumentality including an element yieldable in the presence of resistance by the seated blank.

121. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, said mechanism including a reciprocating element, and mechanism movable in synchronism with said element for presenting a blank to its seat at the blank presenting station.

122. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, a runway for a succession of blanks, mechanism at the presenting station for presenting a blank to its seat on the carrier, and means operative within the runway for successively delivering a blank from the succession of blanks to said presenting mechanism at timed intervals.

123. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating blank gripping element.

124. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway and a blank presenting instrumentality operative to move a blank from said runway to its seated position on the carrier, said instrumentality including a reciprocating element having blank gripping fingers adapted to engage the blank and carry it to its seated position, and means for releasing said fingers after the blank has been seated.

125. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating element having blank gripping fingers adapted to engage the blank and carry it to its seated position, and means for releasing said fingers after the blank has been seated, said fingers having extensions, said latter means including a stationary element located in the path of travel of such extensions.

126. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating blank gripping element, a temporary support between said runway and the blank seat for supporting the blank to permit blank gripping action, and means for moving said support to release the blank when the latter has been gripped.

127. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating blank gripping element, a temporary support between said runway and the blank seat for supporting the blank to permit blank gripping action, and means for moving said support to release the blank when the latter has been gripped, said latter means including a pair of members normally positioned in coöperating relation to produce the supporting action, and means for opening said members at a predetermined time.

128. In apparatus for testing the leakage qualities of blanks and in which the blanks are successively located at a testing station. a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating blank gripping element, a temporary support between said runway and the blank seat for supporting the blank to permit blank gripping action, and means for moving said support to release the blank when the latter has been gripped, said latter means including a pair of members normally positioned in coöperating relation to produce the supporting action, and means movable with said gripping element for opening said members at a predetermined time.

129. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway, and a blank presenting instrumentality operative to move a blank from said runway to its seated position on the carrier, said instrumentality including a reciprocating blank gripping element, a temporary support between said runway and the blank seat for supporting the blank to permit blank gripping action, and means for moving said support to release the blank when the latter has been gripped, said latter means including a pair of members normally positioned in coöperating relation to produce the supporting action, and a member-opening structure movable with said gripping element.

130. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway having an opening for the passage of the blank, a device adjacent said opening for locating the blank in position relative to said opening, and a blank presenting instrumentality operative to move a blank through the opening to a seated position on the carrier.

131. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway having an opening for the passage of the blank, a device adjacent said opening for locating the blank in position relative to said opening, and a blank presenting instrumentality operative to move a blank through the opening to a seated position on the carrier, said device including a magnet.

132. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank runway having a portion adapted to deliver blanks by gravity and also having an opening in proximity to the end of said portion, a device adjacent said opening for substantially positioning a blank relative to the opening, and a blank presenting instrumentality operative to move a blank through the opening to its seated position on the carrier.

133. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank-presenting instrumentality movable to place a blank on its seat on the carrier, blank supply mechanism, a runway leading from said supply into the path of travel of said instrumentality, and means intermediate the ends of the runway for permitting an accumulation of blanks and for releasing the accumulated blanks individually.

134. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank-presenting instrumentality movable to place a blank on its seat on the carrier, blank supply mechanism, a runway leading from said supply into the path of travel of said instrumentality, and means intermediate the ends of the runway for permitting an accumulation of blanks and for releasing the accumulated blanks individually at predetermined timed intervals.

135. In apparatus for testing the leakage qualities of blanks and in which the blanks are successively located at a testing station, a movable blank carrier having a seat for freely supporting a blank and presenting it at the testing station, and means for positioning a blank on its seat in advance of the carrier movement to locate the blank at such station, said means comprising a blank-presenting instrumentality movable to place a blank on its seat on the carrier, blank supply mechanism, a runway leading from said supply into the path of travel of said instrumentality, and means intermediate the ends of the runway for permitting an accumulation of blanks and for releasing the accumulated blanks individually, said runway having a configuration to cause the released blank to move to a predetermined position with respect to said instrumentality by gravitation, and a device operative relative to said runway for locating the released blank in such predetermined position.

136. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, mechanism for presenting a blank to its seat at the seating station, and means operative intermediate the presenting and testing stations for correcting mispositioning of the seated blank.

137. In apparatus for testing the leakage qualities of blanks and in which positioned blanks are successively located in testing and blank discharging stations, a blank presenting station, a rotatable blank carrier having a plurality of seats for freely supporting individual blanks and movable to position seats in said stations in sequential order, testing mechanism operative on the blank while located at the testing station, mechanism for presenting a blank to its seat at the seating station, and means operative intermediate the presenting and testing stations for correcting mispositioning of the seated blanks, said presenting mechanism and said position-correcting means being operative in synchronism with the testing mechanism.

In testimony whereof I have hereunto set my hand.

LEONARD GERHARDT.